United States Patent
Pierjok et al.

(10) Patent No.: US 7,338,400 B2
(45) Date of Patent: Mar. 4, 2008

(54) MOTOR BELT TENSIONING CONSTRUCTION FOR AN AIR HANDLING UNIT

(75) Inventors: Wayne Joseph Pierjok, Gallatin, MO (US); Dennis Timothy Diamond, York, PA (US); Robert H. Edgell, Mount Wolf, PA (US); Jyotindra S. Shah, York, PA (US); Anthony J. Reardon, Columbia, PA (US)

(73) Assignee: Johnson Controls Technology Company, Holland, MI (US)

( * ) Notice: Subject to any disclaimer, the term of this patent is extended or adjusted under 35 U.S.C. 154(b) by 575 days.

(21) Appl. No.: 10/916,847

(22) Filed: Aug. 12, 2004

(65) Prior Publication Data

US 2005/0037878 A1 Feb. 17, 2005

Related U.S. Application Data

(60) Provisional application No. 60/495,042, filed on Aug. 14, 2003.

(51) Int. Cl.
*F16H 7/14* (2006.01)
*F04B 35/00* (2006.01)

(52) U.S. Cl. .............. 474/115; 474/114; 417/362; 417/359

(58) Field of Classification Search ........ 474/114–117, 474/101, 104; 417/362, 423.7, 423.8, 423.14; 415/126, 203, 206; 248/657, 559
See application file for complete search history.

(56) References Cited

U.S. PATENT DOCUMENTS

| | | | |
|---|---|---|---|
| 1,360,720 A | 11/1920 | Brown et al. | |
| 1,756,932 A * | 5/1930 | Bacher | 474/115 |
| 2,646,951 A * | 7/1953 | Sloyan | 248/655 |
| 2,790,524 A | 4/1957 | Herrschaft | |
| 3,002,235 A | 10/1961 | Fountain | |
| 3,054,486 A | 9/1962 | De La Rambelje | |
| 3,117,715 A * | 1/1964 | Bloomingdale | 417/362 |
| 3,118,315 A | 1/1964 | Loosli | |
| 3,128,852 A | 4/1964 | Chell et al. | |
| 3,169,737 A * | 2/1965 | Wilson | 248/621 |

(Continued)

FOREIGN PATENT DOCUMENTS

JP 02225850 A 7/1990

(Continued)

*Primary Examiner*—Marcus Charles
(74) *Attorney, Agent, or Firm*—McNees Wallace & Nurick LLC

(57) ABSTRACT

A belt tensioning system for a motor and a belt-driven blower each secured inside an air handling unit. The blower rotatably carries a first shaft, a first sheave and a bladed arrangement being secured to the first shaft. A second sheave secured to a second shaft is rotatably carried by the motor. A belt engaging the periphery of the first sheave and the second sheave urges the first sheave to rotate about the first shaft in response to the motor urging the second sheave to rotate about the second shaft. An adjuster having adjustment means is secured to the structure. Actuating the adjustment means in a direction urges the motor either toward the adjuster or away from the adjuster to vary the distance between the first sheave and the second sheave to vary the tension in the belt.

9 Claims, 27 Drawing Sheets

U.S. PATENT DOCUMENTS

| | | | |
|---|---|---|---|
| 3,310,926 A | 3/1967 | Brandreth et al. | |
| 3,392,655 A | 7/1968 | Chambers et al. | |
| 3,420,029 A | 1/1969 | Martin | |
| 3,461,633 A | 8/1969 | Ziegelman et al. | |
| 3,540,116 A | 11/1970 | Drahos et al. | |
| 3,593,469 A | 7/1971 | Wall | |
| 3,782,062 A | 1/1974 | Woods et al. | |
| 3,814,358 A * | 6/1974 | Sloyan | 248/655 |
| 3,818,655 A | 6/1974 | Carter, Sr. | |
| 3,832,910 A | 9/1974 | Bryant | |
| 3,921,793 A | 11/1975 | Hutchinson et al. | |
| 4,107,892 A | 8/1978 | Bellem | |
| 4,118,083 A | 10/1978 | Lackey et al. | |
| 4,252,380 A * | 2/1981 | Sloyan et al. | 474/115 |
| 4,267,679 A | 5/1981 | Thompson | |
| 4,327,529 A | 5/1982 | Bigelow, Jr. et al. | |
| 4,327,615 A | 5/1982 | Gerber et al. | |
| 4,352,635 A * | 10/1982 | Saunders | 417/362 |
| 4,381,632 A | 5/1983 | Geitner | |
| 4,393,634 A | 7/1983 | McDermott et al. | |
| 4,470,227 A | 9/1984 | Bigelow, Jr. et al. | |
| 4,482,330 A * | 11/1984 | Cook | 440/2 |
| 4,493,390 A | 1/1985 | Pagano et al. | |
| 4,507,937 A * | 4/1985 | Bretz | 248/558 |
| 4,540,387 A | 9/1985 | Epino | |
| 4,754,587 A | 7/1988 | Glaser | |
| 4,803,804 A | 2/1989 | Bryant | |
| 4,843,788 A | 7/1989 | Gavin et al. | |
| 4,887,399 A | 12/1989 | Berger et al. | |
| 4,896,469 A | 1/1990 | Wright | |
| 4,931,340 A | 6/1990 | Baba et al. | |
| 5,030,173 A | 7/1991 | Bryant | |
| 5,240,461 A | 8/1993 | Hohnl | |
| 5,259,821 A | 11/1993 | Bryant | |
| 5,315,794 A | 5/1994 | Pearson | |
| 5,460,059 A | 10/1995 | Kato | |
| 5,560,150 A | 10/1996 | Pearson | |
| 5,592,787 A | 1/1997 | Ophardt | |
| 5,630,302 A | 5/1997 | Rosenband | |
| 5,727,352 A | 3/1998 | Bared et al. | |
| 5,738,167 A * | 4/1998 | Asbjornson et al. | 417/362 |
| 5,768,840 A | 6/1998 | Feldpausch et al. | |
| 5,826,379 A | 10/1998 | Curry | |
| 5,929,394 A | 7/1999 | Westerbeke, Jr. | |
| 5,996,294 A | 12/1999 | Forslund, III et al. | |
| 6,035,583 A | 3/2000 | Papke | |
| 6,112,473 A | 9/2000 | Pingel | |
| 6,116,374 A | 9/2000 | Westerbeke, Jr. | |
| 6,190,140 B1 * | 2/2001 | Matson | 417/362 |
| 6,200,026 B1 | 3/2001 | Girardey | |
| 6,205,738 B1 | 3/2001 | Chen | |
| 6,276,895 B1 * | 8/2001 | Milana | 417/362 |
| 2002/0129577 A1 | 9/2002 | Weiss | |
| 2002/0182063 A1* | 12/2002 | Edsinger | 415/124.1 |
| 2003/0009966 A1 | 1/2003 | Rieke et al. | |
| 2003/0009969 A1 | 1/2003 | Herbeck et al. | |

FOREIGN PATENT DOCUMENTS

| | | | |
|---|---|---|---|
| JP | 02-225-850 A * | 9/1990 | 474/104 |
| WO | WO 97/29329 | 8/1997 | |
| WO | WO 0150067 | 7/2001 | |
| WO | WO 01/84055 A2 | 11/2001 | |
| WO | WO 01/84056 A2 | 11/2001 | |
| WO | WO 02/39024 A2 | 5/2002 | |

* cited by examiner

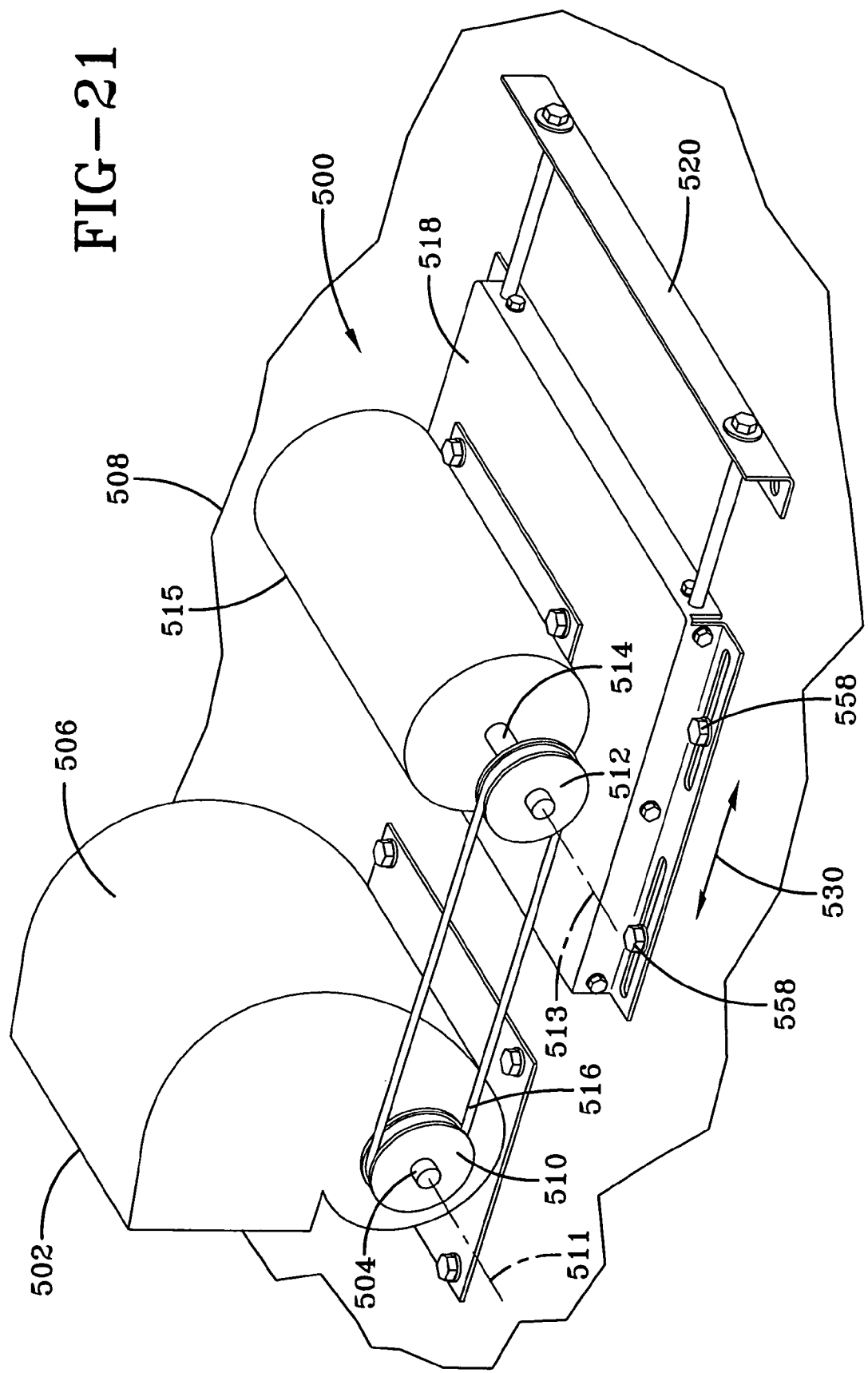

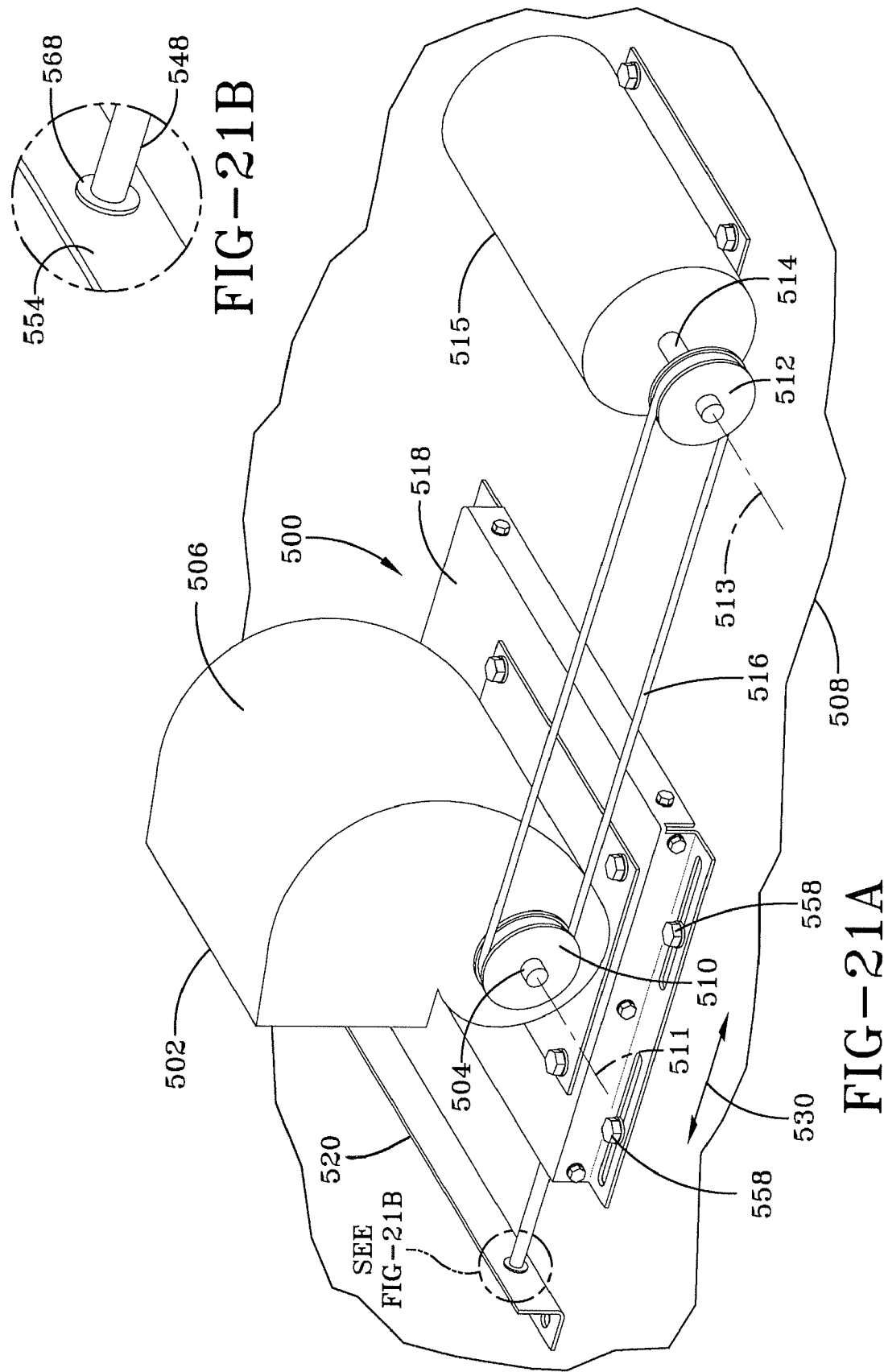

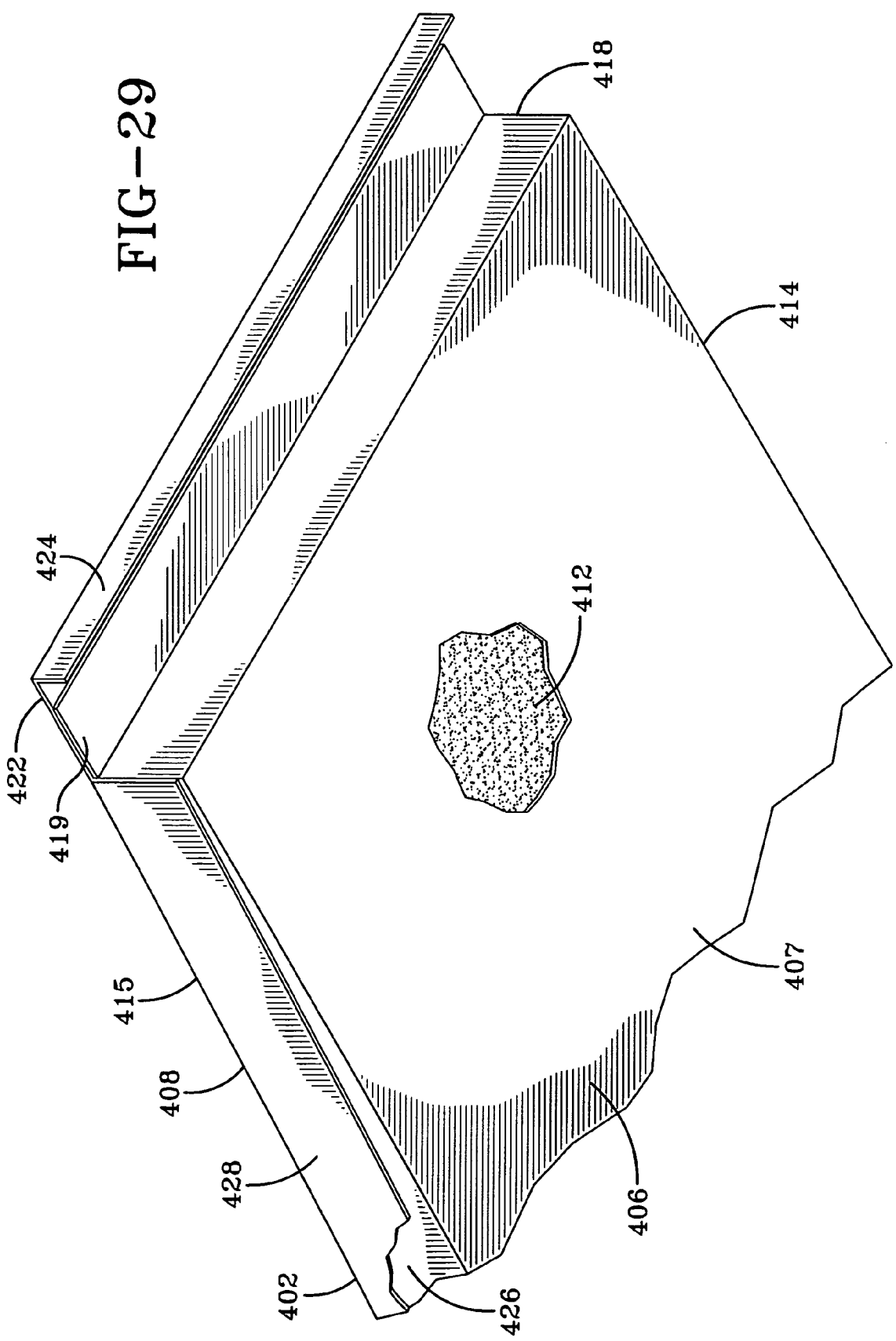

MOTOR BELT TENSIONING CONSTRUCTION FOR AN AIR HANDLING UNIT

CROSS REFERENCE TO RELATED APPLICATIONS

This Application claims the benefit of U.S. Provisional Application No. 60/495,042, filed Aug. 14, 2003, and is related to application Ser. No. 10/916,895, filed contemporaneously with this Application on Aug. 12, 2004, entitled "RACEWAY CONSTRUCTION FOR AN AIR HANDLING UNIT" assigned to the assignee of the present invention and which is incorporated herein by reference, to application Ser. No. 10/916,890, filed contemporaneously with this Application on Aug. 12, 2004, entitled "CORNER CAP MEMBER CONSTRUCTION FOR AN AIR HANDLING UNIT" assigned to the assignee of the present invention and which is incorporated herein by reference, to application Ser. No. 10/916,894, filed contemporaneously with this Application on Aug. 12, 2004, entitled "CORNER ASSEMBLY CONSTRUCTION FOR AN AIR HANDLING UNIT" assigned to the assignee of the present invention and which is incorporated herein by reference, to application Ser. No. 10/917,226, filed contemporaneously with this Application on Aug. 12, 2004, entitled "PANEL CONSTRUCTION FOR AN AIR HANDLING UNIT" assigned to the assignee of the present invention and which is incorporated herein by reference, to application Ser. No. 10/917,215, filed contemporaneously with this Application on Aug. 12, 2004, entitled "ROOF PANEL CONSTRUCTION FOR AN AIR HANDLING UNIT" assigned to the assignee of the present invention and which is incorporated herein by reference, and to application Ser. No. 10/916,852, filed contemporaneously with this Application on Aug. 12, 2004, and issuing as U.S. Pat. No. 7,128,302 entitled "VIBRATIONALLY ISOLATED SUPPORT CONSTRUCTION FOR AN AIR HANDLING UNIT" assigned to the assignee of the present invention and which is incorporated herein by reference.

FIELD OF THE INVENTION

The present invention is directed to an air handling unit construction, and more particularly, is directed to a motor belt tensioning construction that varies the tension associated with belt-driven components operating in the air handling unit.

BACKGROUND OF THE INVENTION

Air Handling Units (AHUs) are one of several components in cooling and heating systems. They are an important component as the AHU houses a number of components used in the system to provide forced air for climate control in a particular structure. AHU components typically include motors, heating/cooling coils, and blowers as well as the required interface connections to effect such climate control.

The AHU is an enclosed interconnected framed panel structure. The framed panel structures have insulated panels that are supported between framing members, also referred to as raceways, to define interconnected rectangular compartments. AHUs are typically large and bulky, the amount of floor space required to accommodate the AHU being commonly referred to as a "footprint." Due to the layout of a particular structure, the AHU may be located in any number of locations, including rooftop installations.

While the AHU construction may be considered bulky, typically its size is dictated by the component configuration selected and performance requirements associated with those components for efficient operation. In fact, an interior compartment containing a blower assembly and the associated driving means, typically a motor and drive belt arrangement, leaves little remaining space for installation or maintenance after subtracting the volume already occupied by insulated panels, support structure, wiring and other components. Despite such limited space, it is critical that the blower assembly and the driving means be properly aligned, and in the case of a belt drive, that a sufficient, but not excessive, amount of belt tension be provided. Failure to provide proper alignment and belt tension may both decrease the operating efficiency of the motor and blower assembly and cause premature failure of the belt, bearings or associated components, and may cause nuisance tripping of the motor overload switch due to overloading the motor. Additionally, movement, or slippage, between the belt and the driving means may generate noise due to inadequate belt tension.

In response to this concern, Japanese Publication No. 02225850A is directed to a pair of adjustable pneumatic dampers interposed between a blower and a motor for maintaining both a parallel alignment between the rotary shafts of the blower and the motor and constant belt tension. In response to changes in belt tension during the operation of the motor and blower, valves within the dampers regulate the amount of force exerted by one damper with respect to the other to provide the parallel alignment between the rotary shafts of the blower and the motor. However, the requirement for pneumatic dampers, a pneumatic source for adjusting the pneumatic dampers, valves, and the control system necessary to monitor and maintain both alignment and belt tension adds significant costs to the AHU construction.

What is needed is an air handling unit construction provided with a motor belt tensioning construction that is both easily and controllably adjustable in tight quarters having a minimum number of components to minimize costs associated with fabrication and installation.

SUMMARY OF THE INVENTION

The present invention relates to a belt tensioning system for an air handling unit including a blower having a housing adjustably securable to a structure inside the air handling unit, the housing rotatably carrying a first shaft about a first axis. A first sheave and a bladed arrangement are secured to the first shaft, and a second sheave is secured to a second shaft rotatably carried by a motor about a second axis. The motor is adjustably securable to the structure. A belt engages the periphery of the first sheave and the second sheave, wherein the belt urging the first sheave and the bladed arrangement to rotate about the first shaft in response to the motor urging the second sheave to rotate about the second shaft. An adjuster is secured to the structure adjacent to at least one of the blower and the motor. The adjuster having adjustment means secured to one of the motor when the adjuster is adjacent the motor and the housing when the adjuster is adjacent the blower. Actuating the adjustment means urges at least a portion of one of the housing and the motor in a direction to vary the distance between the first sheave and the second sheave to adjust the tension in the belt.

The present invention further relates to a method for adjusting belt tension between a motor and a belt-driven component in an air handling unit. The steps include: providing the belt-driven component adjustably securable to a structure inside the air handling unit, the belt-driven component rotatably carrying a first shaft about a first axis, the component having a first sheave secured to the first shaft; providing a motor, the motor having a second sheave secured to a second shaft rotatably carried by the motor about a second axis, the motor adjustably securable to the structure, a belt engaging the periphery of the first sheave and the second sheave, wherein the belt urging the first sheave to rotate about the first shaft in response to the motor urging the second sheave to rotate about the second shaft; providing an adjuster secured adjacent to at least one of the belt-driven component and the motor; securing one of the motor and the belt-driven component to the structure; securing the adjustment means to one of the motor when the adjuster is adjacent the second axis, and to the belt-driven component when the adjuster is adjacent the first axis; actuating the adjustment means to urge at least a portion of one of the belt-driven component and the motor in a direction to vary the distance between the first sheave and the second sheave to adjust the tension in the belt; and securing the remaining one of the motor and the belt-driven component to the structure.

The present invention still further relates to a belt tensioning system for an air handling unit including a blower having a housing adjustably securable to a structure inside the air handling unit, the housing rotatably carrying a first shaft about a first axis. A first sheave and a bladed arrangement are secured to the first shaft, a second sheave is secured to a second shaft rotatably carried by a motor about a second axis. The motor is adjustably securable to the structure. A belt engages the periphery of the first sheave and the second sheave, wherein the belt urging the first sheave and the bladed arrangement to rotate about the first shaft in response to the motor urging the second sheave to rotate about the second shaft. An adjuster is secured to the structure adjacent to the motor, the adjuster having adjustment means secured to the motor when the adjuster is adjacent the motor. Actuating the adjustment means urges at least a portion of the motor in a direction to vary the distance between the first sheave and the second sheave to adjust the tension in the belt.

The present invention still further relates to a belt tensioning system for an air handling unit including a blower having a housing adjustably securable to a structure inside the air handling unit, the housing rotatably carrying a first shaft about a first axis. A first sheave and a bladed arrangement are secured to the first shaft, a second sheave is secured to a second shaft rotatably carried by a motor about a second axis. The motor is adjustably securable to the structure. A belt engages the periphery of the first sheave and the second sheave, wherein the belt urging the first sheave and the bladed arrangement to rotate about the first shaft in response to the motor urging the second sheave to rotate about the second shaft. An adjuster is secured to the structure adjacent to the blower, the adjuster having adjustment means secured to the housing when the adjuster is adjacent the blower. Actuating the adjustment means urges at least a portion of the housing in a direction to vary the distance between the first sheave and the second sheave to adjust the tension in the belt.

An advantage of the present invention is the provision of an adjustable platform assembly configured for achieving motor belt tensioning/alignment in the tight quarters of an AHU compartment.

A further advantage of the present invention is the ability to perform adjustments to the platform assembly with a single tool to achieve motor belt tensioning/alignment.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 21 is a perspective view of a blower assembly and belt-driven motor mounted to an adjustable platform assembly of the present invention;

FIG. 21A is a perspective view of a belt-driven motor and a blower assembly mounted to an adjustable platform assembly of the present invention.

FIG. 21B is an enlarged partial perspective view taken from region 21B of FIG. 21A.

FIG. 29 is a partial perspective view of the sloped roof assembly invention.

Wherever possible, the same reference numbers will be used throughout the drawings to refer to the same or like parts.

DETAILED DESCRIPTION OF THE INVENTION

Figure 1:
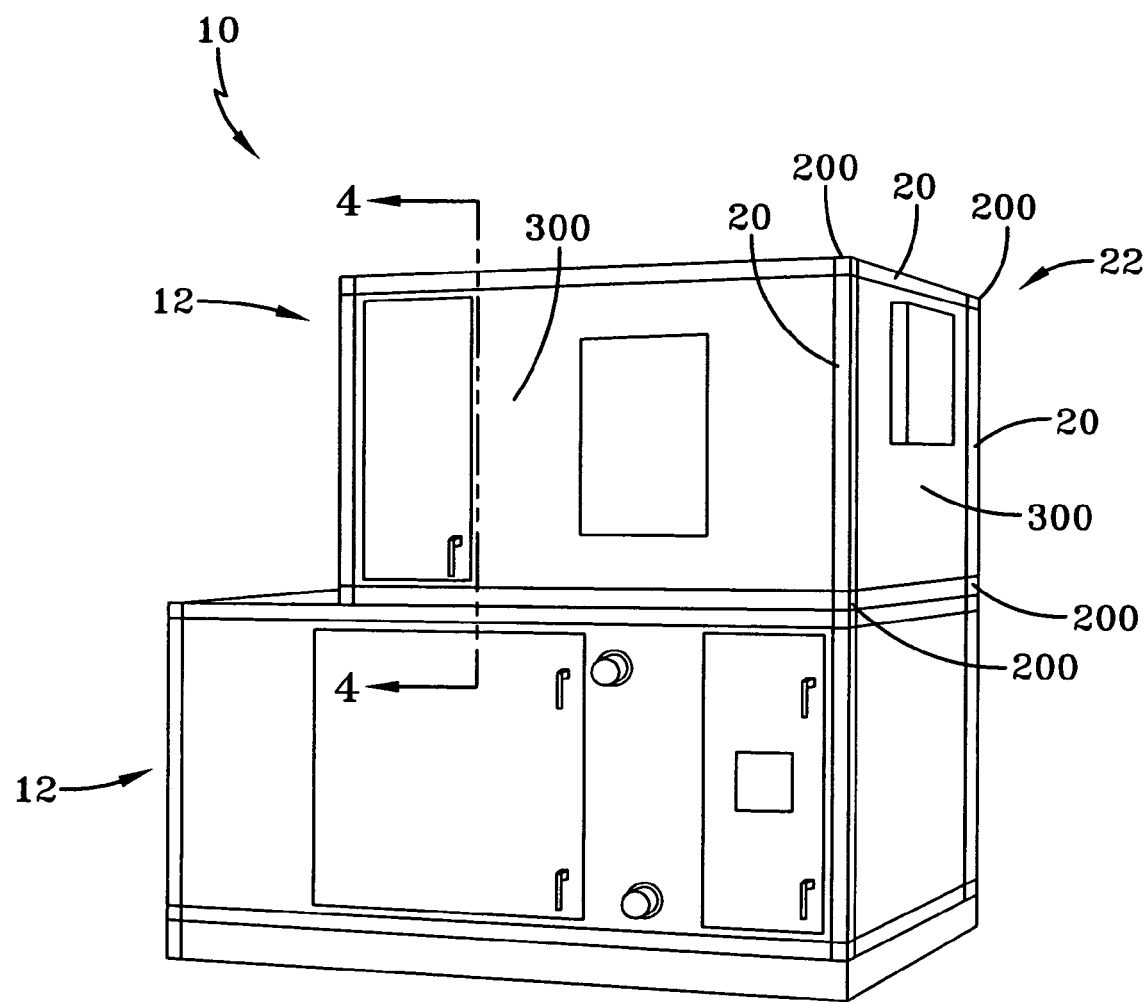
FIG. 1 is an overall perspective view of an AHU of the present invention.

The present invention relates to framing members that are comprised of interconnected raceways which are adapted to both structurally and sealingly carry rectangular insulated panels. Having a closed cross sectional profile, the raceway is sufficiently stiff to satisfy the most rigorous structural loading requirements, while maintaining a lightweight construction. The raceway has a single profile that is configured to be used regardless of whether the raceway defines a lower horizontal, upper horizontal, left vertical or right vertical frame member for surrounding the rectangular panel. The raceway also provides an identical, continuous seam or recess for securing each side of the panel. Additionally, the raceway may be provided with a universal aperture arrangement adjacent to its ends for use with the appropriate connectors to permit splicing and/or lifting points at the corners of the AHU structure or at any position along the span of the raceway.

The raceway defines a closed geometric profile including a first segment which extends to a first recessed portion, a second segment extending to a second recessed portion, closing portions extending from the first and second recessed portions, the closing portions terminating at a flange portion. The first and second segments have an edge portion and are substantially perpendicular to each other. The collective profile defined by the first segment and first recessed portion is substantially a mirror image of the collective profile defined by the second segment and second recessed portion about a plane (plane of symmetry) passing through the edge portion that bisects the angle between the first and second segments. This symmetry provides an identical, continuous seam or recess for securing each side of the panel. The flange portion of the raceway when assembled as an upper horizontal frame member secures a wire way for providing both a convenient and effective passage for routing electrical wiring, or other flexible lines associated with AHU operation, as well as providing peripheral support for a top or ceiling insulating panel or roof panel. Additionally, the flange portion may provide a supplemental peripheral seal between each of the top and bottom, i.e., ceiling and floor, insulated panels.

In other words, the present invention relates to a profile for a structural member for constructing an air handling unit including a first segment having a first end and a second end, a first recessed portion extending from the second end. A plane of symmetry is coincident with the first end at a predetermined angle from the first segment. A second segment has a third end that is coincident with the first end and a fourth end, a second recessed portion extending from the fourth end. The second segment and the second recessed portion are symmetrical about the plane of symmetry with the first segment and the first recessed portion, and the first recessed portion extends to a third segment. The second recessed portion extends to a fourth segment, and the third segment and the fourth segment form an edge portion, wherein the first segment, the second segment, the first recessed portion, the second recessed portion, the third segment, and the fourth segment define a closed geometry.

In an alternate embodiment, the raceway defines a closed geometric profile including a first segment which extends to a first recessed portion, a second segment extending to a second recessed portion, a third segment and a fourth segment extending from the first recessed portion and the second recessed portion, respectively, the fourth segment extending to a third recessed portion, the third recessed portion and the third segment terminating at a flange portion. The first and second segments have an edge portion and are substantially perpendicular to each other. The collective profile defined by the first segment, the first recessed portion, and the third segment (not including the flange portion) is substantially a mirror image of the collective profile defined by the second segment, the second recessed portion, and the fourth segment about a plane (plane of symmetry) passing through the edge portion that bisects the angle between the first and second segments. This symmetry provides an identical, continuous seam or recess for securing each side of the panel. The flange portion of the raceway when assembled as an upper horizontal frame member secures a wire way for providing both a convenient and effective passage for routing electrical wiring, or other flexible lines associated with AHU operation, as well as providing peripheral support for a top or ceiling insulating panel or roof panel. Additionally, the flange portion may provide a supplemental peripheral seal between the top and bottom, i.e., ceiling and floor, insulated panels.

In other words, an alternate embodiment of the present invention relates to a profile for a framework for constructing an air handling unit compartment framework including a plurality of structural members having opposed ends including a first segment having a first end and a second end, a first recessed portion extending from the second end. A plane of symmetry is coincident with the first end at a predetermined angle from the first segment. A second segment has a third end that is coincident with the first end and a fourth end, a second recessed portion extending from the fourth end. The first recessed portion extends to a first closing position, and the second recessed portion extends to a fourth segment. The second segment, the second recessed portion and the fourth segment are substantially symmetrical about the plane of symmetry with the first segment, the first recessed portion and the third segment. The third segment and the fourth segment extend to form an edge portion, wherein the first segment, the second segment, the first recessed portion, the second recessed portion, the third segment, and the fourth segment define a closed geometry. A plurality of structural fittings each receive the opposed ends of the plurality of structural members to form at least two frames. Remaining structural members of the plurality of structural members are interposed between the at least two frames, the opposed ends of the remaining structural members being interconnected to the at least two frames.

The present invention further relates to an air handling unit construction including a plurality of structural members having opposed ends including a first segment having a first end and a second end. A first recessed portion extends from the second end, and a plane of symmetry is coincident with the first end at a predetermined angle from the first segment. A second segment having a third end is coincident with the first end and a fourth end, and a second recessed portion extends from the fourth end, the second segment and the second recessed portion being symmetrical about the plane of symmetry with the first segment and the first recessed portion. The first recessed portion extends to a third segment, and the second recessed portion extends to a fourth segment, the third segment and the fourth segment forming an edge portion. The first segment, the second segment, the first recessed portion, the second recessed portion, the third segment, and the fourth segment define a closed geometry. A plurality of structural fittings each receive opposed ends of the structural members to form at least two frames, remaining structural members of the plurality of structural members being interposed between the at least two frames. The opposed ends of the remaining structural members are interconnected to the at least two frames to form a framework, and a plurality of panels are received by the framework to form an enclosed panel structure.

The raceways can be injected with insulating material to significantly eliminate the formation of condensation, which could cause corrosion of the raceways. The addition of insulating material also increases the efficiency of the heat and cooling system.

An orthogonal corner of the frame structure may be formed by receiving one end of three different raceways in a corner member, each of the three raceways being secured to the corner member in a mutually perpendicular arrangement. The corner member further provides identical, continuous joints with each of the raceways.

The corner member forms a common corner point that extends into three orthogonal surfaces. Each of the three orthogonal surfaces defines an L-shaped portion, with each L-shaped portion having two legs of substantially equal length. Each leg of one L-shaped portion connects to one leg of each of the other L-shaped portions, each connection between adjacent legs defining an edge. The corner member defines three mutually perpendicular edges that terminate at the common corner point. Thus, the end of each edge opposite the common corner point terminates at the ends of adjacent legs that are perpendicular to each other, providing two perpendicular surfaces. One end of each raceway is directed into contact with the corner member along one of these edges, the connection between the raceway and the two perpendicular surfaces of the corner member being secured by fasteners being directed through apertures formed in mutually aligned arrangements.

In addition to the aperture arrangements, the corner assembly includes an aperture formed in each L-shaped portion preferably adjacent the junction between edges. The two larger apertures are configured to receive a lifting lug to permit ease of transport for the assembled framed structure, while the smaller aperture is a tooling aperture for use during manufacturing of the framed structure.

A corner cap member is preferably of unitary construction and when installed over a corner member that has been secured to three orthogonally oriented raceways, forms a substantially continuous coplanar surface with each of the two prominent raceway surfaces of the three raceways which are visible outside the framed structure of the AHU. The corner cap member covers only a substantially rectangular portion of the corner member that remains exposed after the raceways have been secured to the corner member. Apertures formed in the corner cap member are substantially coincident with the apertures formed in the corner member. A pair of opposed tabs extend from upper portions of adjacent rectangular portions toward each other in a direction perpendicular to its respective surface. Upon installation of the corner cap member over the corner member, the tabs are configured to extend past their corresponding L-shaped member to provide a continuous joint in a recess formed in two orthogonal raceways for the purpose of receiving a weld joint. Generally, the corner cap member edges are adapted to receive a weld joint along the common periphery between the cap member, the raceways and the corner member.

The present invention also relates to providing an insulated panel that is inserted in a recess formed along the raceway frames. The connectors, panels and raceways define framed structures typically used with AHUs. The insulated panels for use with AHUs are constructed using a minimum of parts and may be sized according to a customer's individual needs to define virtually any number of different aspect ratios and dimensions, while still complying with structural stiffness standards as well as assembled air leakage standards. Additionally, a single panel construction may be employed irrespective the location of the panel in the AHU. That is, ceiling, wall and floor panel constructions are the same.

A fixture for securing injected insulation material therein includes a centrally positioned base of the fixture having opposed risers extending from sides of the base in a direction substantially perpendicular to the base, which risers further extend to inwardly directed coplanar flanges, and opposed ends. A layer of foam tape having opposed adhesive surfaces is applied along the outside surface of each flange for bonding to an exterior skin. This foam tape also presents a low thermal conductivity, and serves as a thermal barrier to conduction. The exterior skin, which is preferably a substantially flat rectangular plate, is then positioned over the fixture, the length of overhang between the ends of the exterior skin and the corresponding sides and ends of the fixture preferably being substantially the same. Once the exterior skin is bonded to the fixture by virtue of the foam tape, the assembled exterior skin, foam tape and fixture collectively define a closed interior chamber for receiving insulating material therein.

The insulating material is then injected by an injection gun inside the chamber through apertures formed in the exterior skin using a specially configured press to ensure the fixture and exterior skin are sufficiently supported against the force of the insulating material that is injected at an elevated pressure level. The volume of the chamber is calculated prior to the injection operation. A precise amount of insulating material is injected into the chamber by correcting for the ambient conditions at the time of injection as it is desirable to completely fill the chamber with insulating material. Since the flow rate of the injected material through the injection gun is a known value, the duration of flow is the variable parameter which is precisely controlled to achieve the proper amount of injected insulation material. Once the injection process is completed and the injected insulating material has cured, the insulated panel is installed in the AHU frame structure.

Four raceways joined by corner connectors collectively define a raceway frame or structure that surrounds and supports each insulated panel. To prepare the raceway frame for installation of the insulated panel, a layer of single-sided adhesive foam tape is applied to each of the four recessed surfaces along each of the four raceways surrounding the panel. The recessed surfaces define a recessed periphery for sealingly securing the insulated panel therein. Single sided adhesive tape is used to permit the insulated panel to be easily removed from the frame structure. The insulated panel is then installed into the frame structure, the recessed surfaces of the raceways being configured such that the overhangs of the exterior skin are brought into physical contact with the recessed periphery defined by the raceways. The installation is the same for both the installation of a top panel or a bottom panel. Once the overhangs of the insulated panel are in physical contact with the recessed periphery of the frame structure, removable fasteners, such as sheet metal screws, are installed at intervals along the overhang using a predetermined range of installation spacing to provide support and a substantially fluid tight seal between the overhang of the exterior skin and the recessed periphery of the frame structure.

The present invention also relates to providing a sloped, insulated roof assembly for use with AHUs. The sloped insulated roof assembly is of unitary construction which preferably comprises two sloped halves abutting along the mid span of the roofline, typically referred to as the peak of the roof. Each sloped half includes a fixture and exterior skin collectively defining a closed chamber for receiving injected insulating material under pressure, similar to the construction of modular insulated panels secured along the recesses of raceway frames. However, unlike the insulated panel, the sloped half is not constructed of uniform thickness. That is, while the sloped half preferably has a horizontal ceiling that is substantially coplanar, the thickness of the sloped half measured along the abutting mid span from the ceiling to its upper surface (the peak) is greater than the thickness of the opposed end of the sloped half measured from the ceiling to its upper surface. The amount of the difference in thickness measurements taken along the mid span versus being taken along the end opposite the mid span is a function of the slope of the roof, preferably at least one quarter of an inch per foot for permitting water drainage.

Extending past the end of the sloped half opposite the mid span along the roofline is a retaining portion for securing the sloped half to a raceway. The retaining portion is preferably sized to receive the raceway, the retaining portion further extending to a retaining flange. Preferably, the surface of the end of the sloped half and surfaces of the retaining portion and retaining flange collectively contact the raceway along its opposed vertical surfaces and along its upper surface. To provide a substantially fluid tight seal between the retaining portion and the raceway, butyl tape may be preferably applied to one of the mating surfaces as required prior to assembly.

To assemble the opposed sloped halves, a spliced connection preferably along or adjacent the ceiling may be provided, if desired. However, such reinforcing connections between the sloped halves are not required due to the vertical support provided by the flange portion of the raceways, as well as support provided by additional walls. The flange portion of the raceways defining the outer walls, also referred as the "footprint" of the framed structure, provides a continuous, peripheral support surface to the roof assembly. However, since the axis of the roof peak corresponds to the greater length of a "footprint" of a framed structure, typically coinciding with the direction of air flow through an AHU, frequently at least one additional vertically oriented raceway frame, also referred to as a bulkhead, is erected perpendicular to the axis defined by the roof peak, which provides considerable additional support. To provide a fluid tight seal along the roof peak, sealing tape or a layer of overlap material may be applied along or secured over the seam, or one of the sloped halves may provide an overlap or any combination of these constructions can be used.

The present invention also relates to providing an adjustable platform assembly for achieving easily controlled motor belt tensioning/alignment between a motor and blower assembly within an AHU compartment or housing. To achieve the desired controlled positioning, either the motor or the blower assembly is fixedly secured to support structure within the compartment, while the other component is secured to an adjustable platform assembly that is positionable by means of sliding along the support structure. In the preferred embodiment, the blower assembly is secured to the support structure and the motor is secured to the platform assembly. In this embodiment, opposite the blower assembly adjacent the platform assembly is a pusher/puller assembly that is fixedly secured to the support structure. The platform assembly preferably comprises a compact hat section member, including a platform for securing the motor, opposed standoff members extending from the platform and opposed flange members extending outwardly from the standoff members. Each of the flange members of the hat section member preferably have a pair of elongated slots formed therein. By loosening fasteners corresponding to each slot that secure the platform assembly to the support structure, the platform assembly is movable along the support structure. The platform of the platform assembly includes multiple slots formed therein to accommodate different motor mounting arrangements. Extending from an end of the platform adjacent the pusher/puller assembly is a flap member configured to secure a pair of threaded blocks preferably positioned along opposite ends of the flap member. To secure each block, at least one bolt is directed through apertures formed in the flap member and/or corresponding structure in the motor base to engage the threaded block. An additional aperture formed in the flap member is aligned with a threaded guide aperture formed in each block to permit access to the guide aperture, each guide aperture to threadedly receive an elongate threaded member from the pusher/puller assembly.

The pusher/puller assembly comprises an angle member having a first and a second leg, the first leg being secured to the support structure. The vertically extending second leg of the angle member includes two apertures through which each pass the elongate threaded member. It is realized that to use the "pusher" capability of the pusher/puller assembly, a retaining means is required, such as a retaining ring, to react the compressive forces directed along the threaded members.

In operation, actuation of either or both of the elongate threaded members which are each threadedly engaged with the block, urge the platform assembly into controlled movement. This controlled movement is especially critical in effecting proper belt tension while maintaining alignment between the sheaves of the motor and blower assembly. Once the elongate members have been sufficiently actuated to provide the desired positioning of the platform assembly, the fasteners that pass through the elongated slots in the platform assembly flange members are secured to the support structure.

The present invention further relates to providing vibrationally isolated support between a vibrating assembly of an AHU, such as a fan assembly, that is supported beneath a separate structural frame. At least two isolator rails having at least one vertical side are mounted to a top panel which is supported by, i.e., stacked upon, a pre-existing structural frame. It is understood that the term "structural frame" may refer to four interconnected raceways to structurally secure a single insulated panel, or more generally, to a plurality of interconnected raceway frames collectively forming a three dimensional frame structure for securing a plurality, such as six, insulated panels. Alternately, isolator rails may also be mounted in the floor, or to any structure requiring vibration isolation and support. The isolator rail connects to a spring comprising a resilient, cupped spring retainer, possibly made of hard rubber, for securing a lower end of a spring member therein. The spring retainer has a centrally positioned protrusion opposite its cupped end for engaging an aperture in the isolator rail. An upper end of the spring opposite the lower end is preferably received by a cupped threaded spring retainer. The threaded spring retainer has a centrally positioned threaded aperture for threadedly receiving an adjusting bolt therein. A head of the adjusting bolt has a coaxially aligned threaded aperture for receiving a cap screw therein.

The assembly to be vibrationally isolated is preferably supported by at least two cross braced spring rails. At least three, and preferably at least four, vibration isolators are utilized and positioned to provide a sufficiently broad support platform for the vibrationally isolated assembly. At each position for installing a vibration isolator, a corresponding portion of spring rail and isolator rail are vertically aligned. The cap screw is directed through an aperture in the spring rail and placed in threaded engagement with the adjusting bolt to secure the spring isolator to the spring rail. The centrally positioned protrusion of the spring retainer engages the corresponding aperture to the isolator rail, the engagement being primarily maintained by the weight of the assembly to be vibrationally isolated.

For the vibration isolator to function as intended, the spring of each spring isolator must be adjusted to substantially evenly carry the collective weight of the assembly to be vibrationally isolated and supporting spring rails. The spring adjustment is achieved by actuating the adjusting bolt with respect to the threaded spring retainer such that the head of the adjusting bolt moves vertically in a direction away from the threaded spring retainer. As the head of the adjustment bolt moves vertically, it abuts the spring rail. Further actuation of the adjusting bolt with respect to the threaded spring retainer, in effect, compresses the spring, the spring compressive force bearing the weight of the assembly to be vibrationally isolated. Although the weight of the vibrationally isolated assembly is supported once the springs have been sufficiently adjusted, vibrationally isolated lateral support must also be provided for stability and to prevent the centrally positioned protrusion of the spring retainer from possibly "bouncing out" of engagement with the aperture in the isolator rail. To provide this lateral support, a leg of an angle is secured to the side wall of the isolator rail, the horizontally extended leg of the angle further securing a grommet therein. A bolt is then passed through axially aligned apertures formed in the spring rail and the grommet and secured in position by a nut. The grommet provides vibration isolation between the bolt and the angle while the bolt simultaneously provides the required lateral support for the vibrationally isolated assembly.

One embodiment of an AHU 10 that incorporates the constructions of the present invention is depicted in FIG. 1.

AHU 10 is an enclosed framed panel structure 12, or series of interconnected framed panel structures 12 which each preferably defines a rectangular compartment that is configured to enclose or house components which provide forced air for climate control in a particular structure. AHU components typically include motors, heating/cooling coils, and blowers as well as the required interface connections to effect such climate control. Framed panel structures 12 have a plurality of insulated panels 300 that are each structurally and sealingly supported by a raceway frame 22. Each raceway frame 22 is comprised of a plurality of raceways 20, preferably four, that are interconnected by corner members 200.

Figure 2:
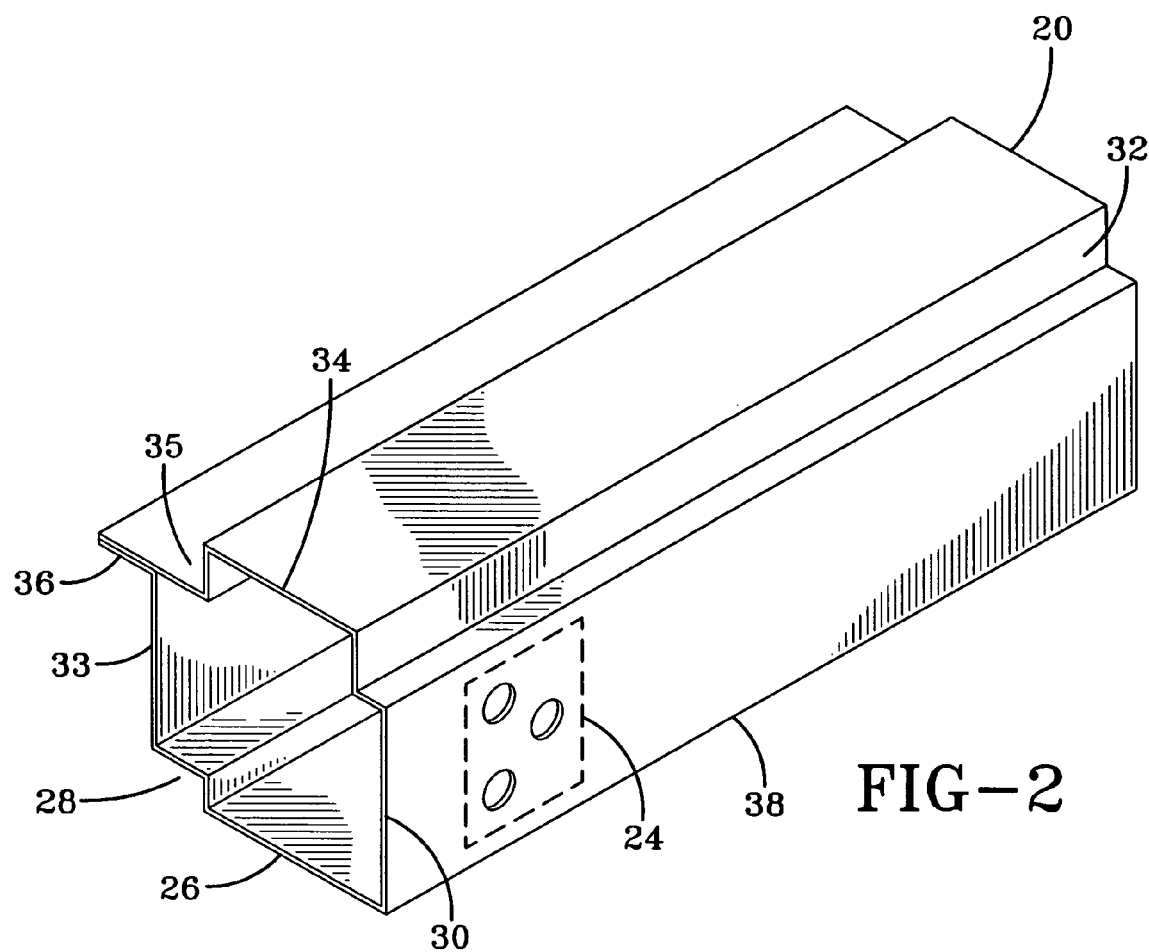
FIG. 2 is a perspective view of a raceway of the present invention.
Figure 3:
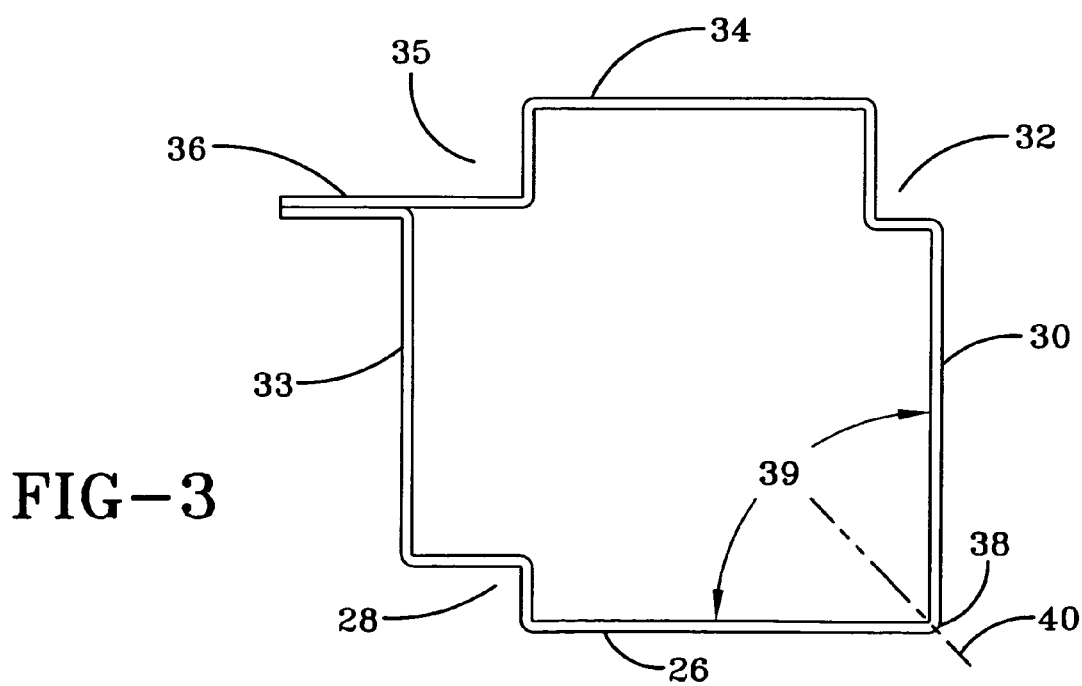
FIG. 3 is a cross section of the raceway of the present invention.
Figure 4:
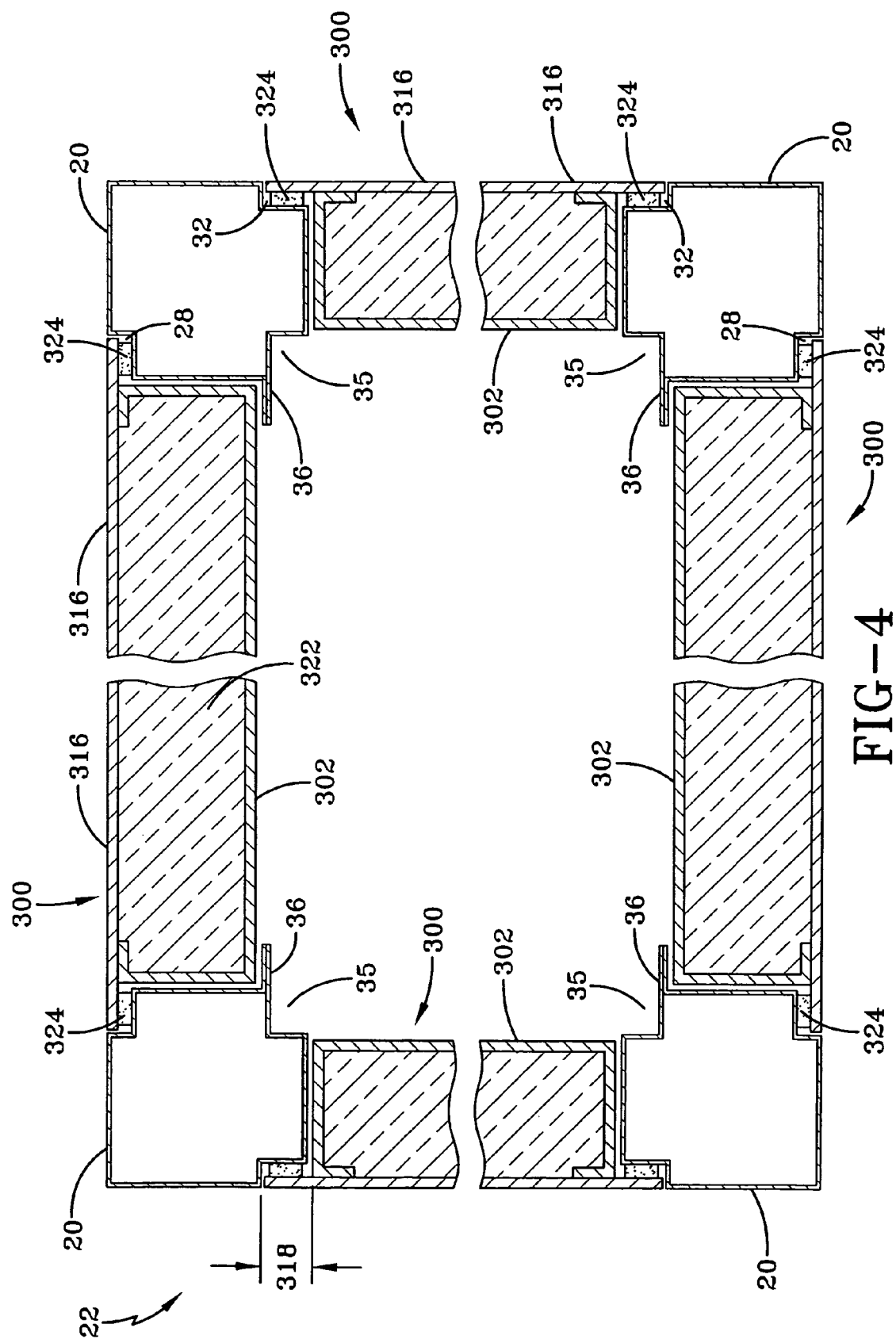
FIG. 4 is a cross-section of a raceway frame taken along line 4-4 of FIG. 1 of the present invention.

Referring to FIGS. 2-4, raceway 20 defines a closed geometric profile including a first segment 26 which extends to a substantially squared first recessed portion 28, a second segment 30 extending into a substantially squared second recessed portion 32, a third segment 33 extending from first recessed portion 28, a fourth segment 34 extending from second recessed portion 32, a third recessed portion 35 extending from fourth segment 34, third segment 33 and third recessed portion 35 terminating at a flange portion 36. First and second segments 26, 30 have an edge portion 38 and are substantially perpendicular to each other. The collective profile defined by first segment 26 and first recessed portion 28 is a mirror image of the collective profile defined by second segment 30 and second recessed portion 32 about a plane 40 (plane of symmetry) passing through edge portion 38 that bisects angle 39 between first and second segments 26, 30. Preferably, first and second segments 26, 30 are orthogonal, thus, angle 39 is ninety degrees and plane 40 is forty five degrees from each of first and second segments 26, 30. Similarly, first and fourth segments 33, 34 are preferably substantially perpendicular to each other, and flange portion 36 is substantially parallel to first segment 26 and fourth segment 34. Since each raceway in a single compartment, enclosed framed panel structure connects to a corner member of the structure, each raceway can structurally support two adjacent insulated panels. By virtue of the symmetry of raceway 20, a single raceway profile may be used for each raceway 20 that is used to construct the structural framework for AHU 10 to provide identical, continuous peripheral seams or recesses for structurally securing each side of each insulated panel.

Figure 16:
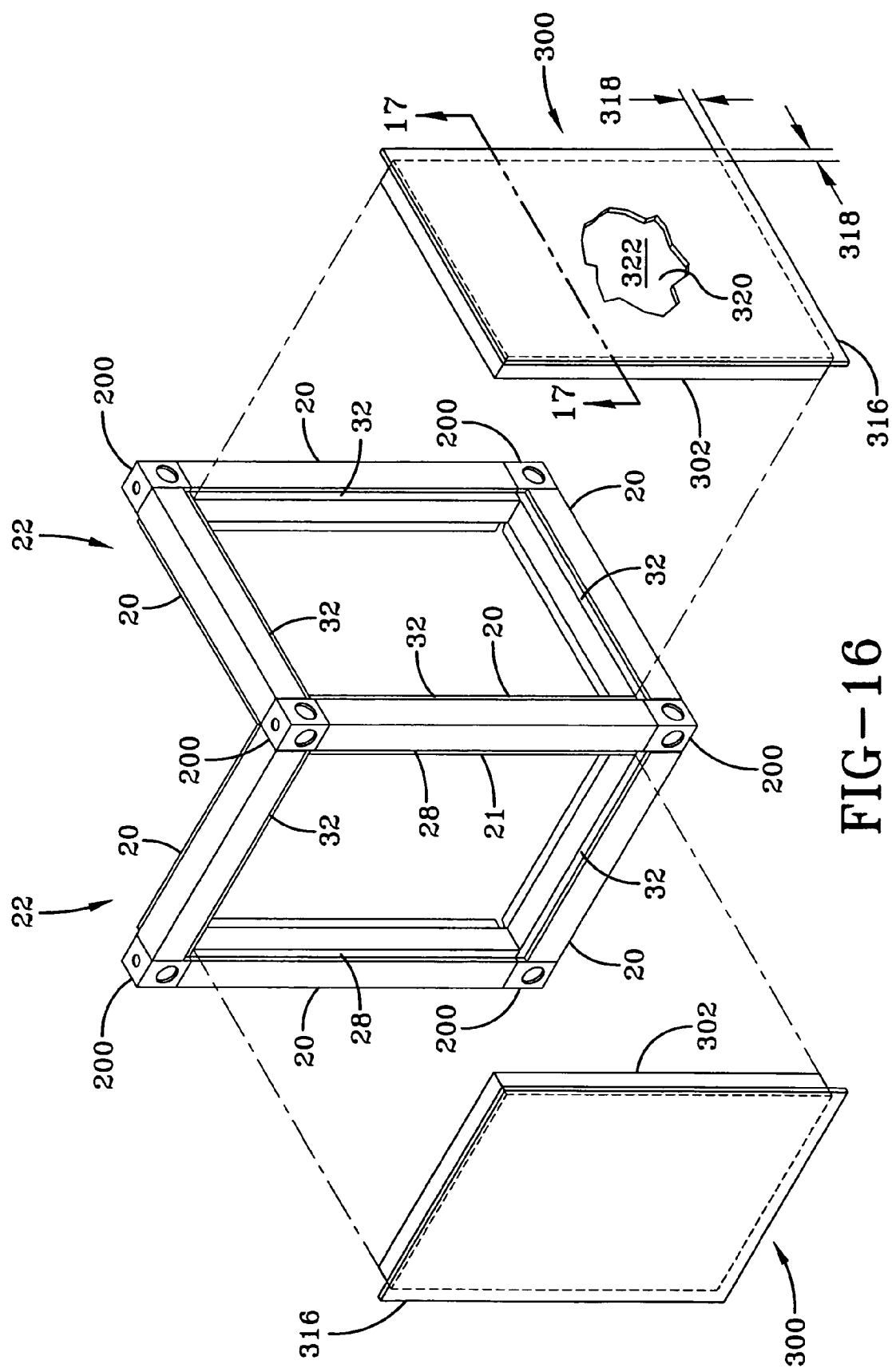
FIG. 16 is an exploded perspective view of insulated panels prior to insertion into adjacent raceway frames of the present invention.
Figure 17:
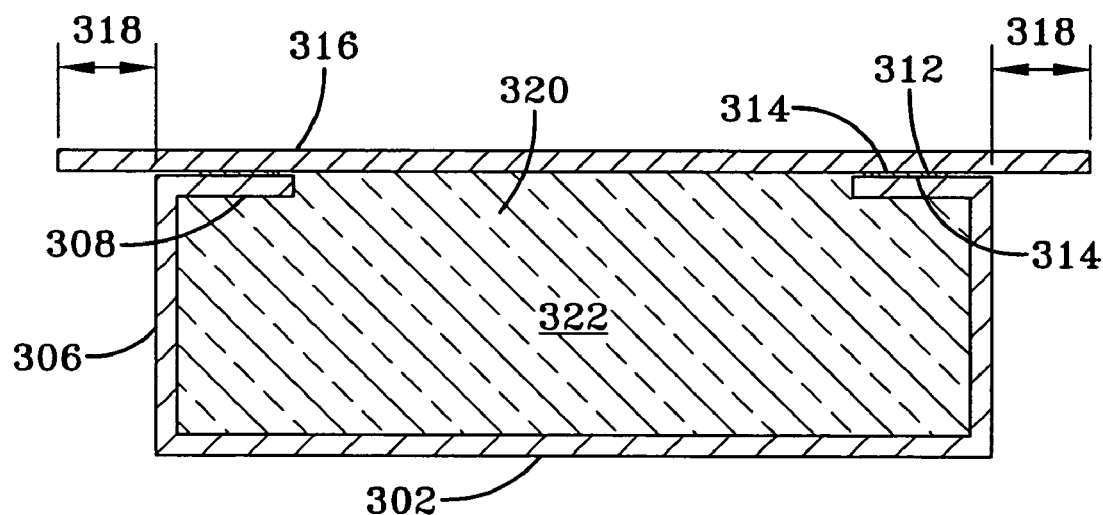
FIG. 17 is a cross section an insulated panel taken along line 17-17 of FIG. 16 of the present invention.
Figure 26:
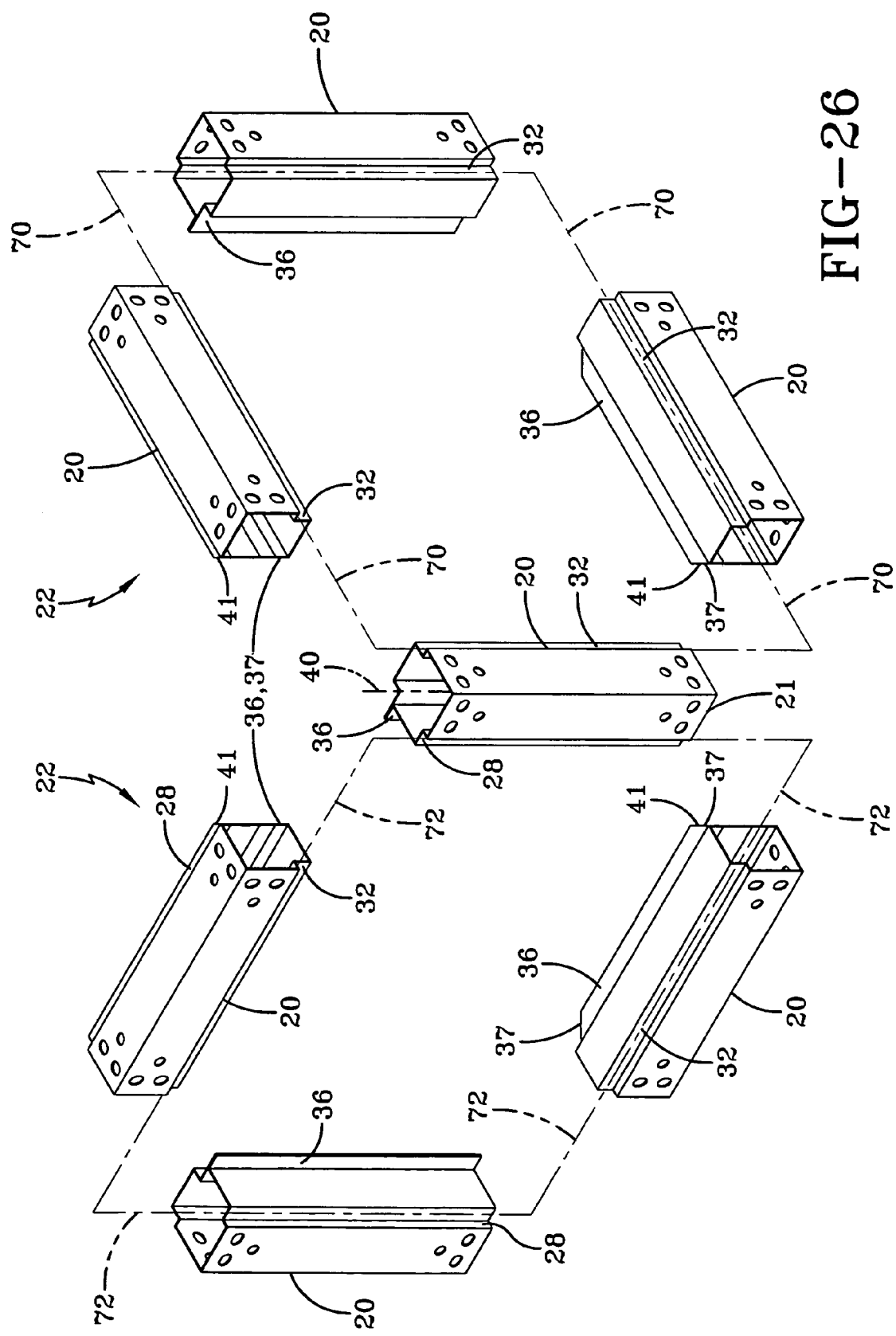
FIG. 26 is an exploded perspective view of adjacent raceway frames, minus corner members, of the present invention.

For example, referring to FIG. 16, two adjacent raceway frames 22 each receiving the corresponding insulated panel 300 are shown, which raceway frame 22 comprising raceways 20 that are interconnected by corner members 200. Common to each raceway frame 22 is the raceway 20 which is located at the common corner, which raceway being referred to as a common raceway 21. One raceway frame 22 peripherally receives each of the four sides of the exterior skin 316 of its corresponding insulated panel 300 in second recessed portion 32 formed in each raceway 20. While the other raceway frame 22 also peripherally receives the four sides the exterior skin 316 of its corresponding insulated panel 300, two of the four sides of the exterior skin 316 are received in first recessed portion 28 that is formed in two of the raceways 20, and the remaining two sides of the exterior skin 316 are received in second recessed portion 32. This means that common raceway 21 (and the other vertically oriented raceway 20 positioned on the far left hand portion of FIG. 26) simultaneously secures one side of each of two different insulated panels 300, one side of insulated panel 300 being supported in first recessed portion 28, and one side of insulated panel 300 being supported in second recessed portion 32. Referring to FIG. 26, which is an enlarged exploded view of FIG. 16 without the corner members 200 and insulated panels 300 to more clearly show the raceway 20 orientations, the raceway construction is shown. A first phantom outline 70 is provided to show the raceway recesses of raceway frame 22 that secure the insulated panel 300 when installed. A second phantom outline 72 is provided to show the raceway recesses of raceway frame 22 that secure the insulated panel 300 when installed. Based on the construction of the raceways 20, including the symmetry for each raceway over the collective length of the first segment 26 and the first recessed portion 28 as compared to the collective length of the second segment 30 and the second recessed portion 32 about the plane of symmetry 40 as previously discussed, the raceway profile may be configured for use with AHU 10 regardless of whether the raceway 20 defines a lower horizontal, upper horizontal, left vertical or right vertical frame member for surrounding and structurally supporting the rectangular insulated panel 300.

Figure 8:
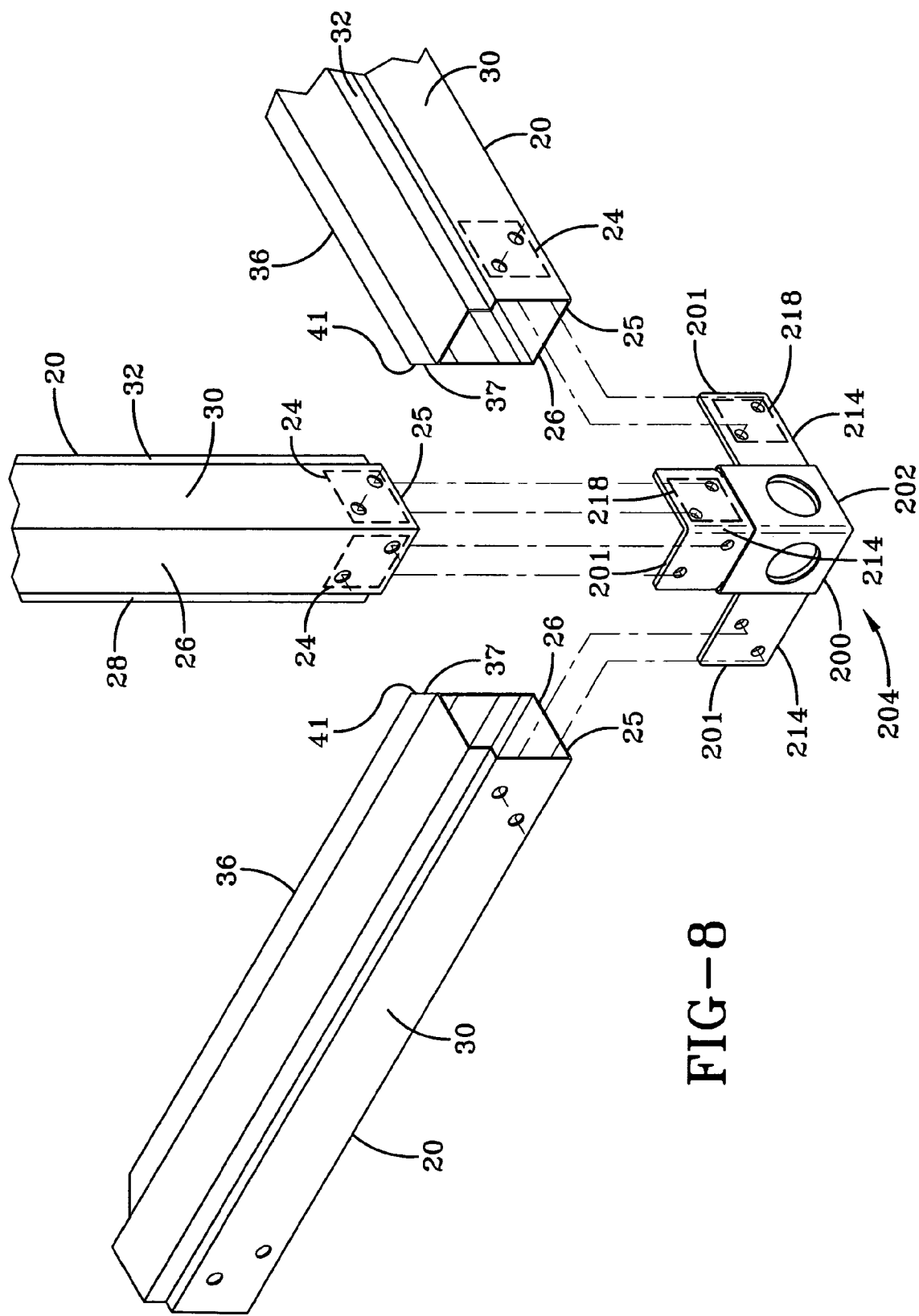
FIG. 8 is an enlarged, exploded perspective view of an orthogonal corner of a raceway frame of the present invention.
Figure 9:
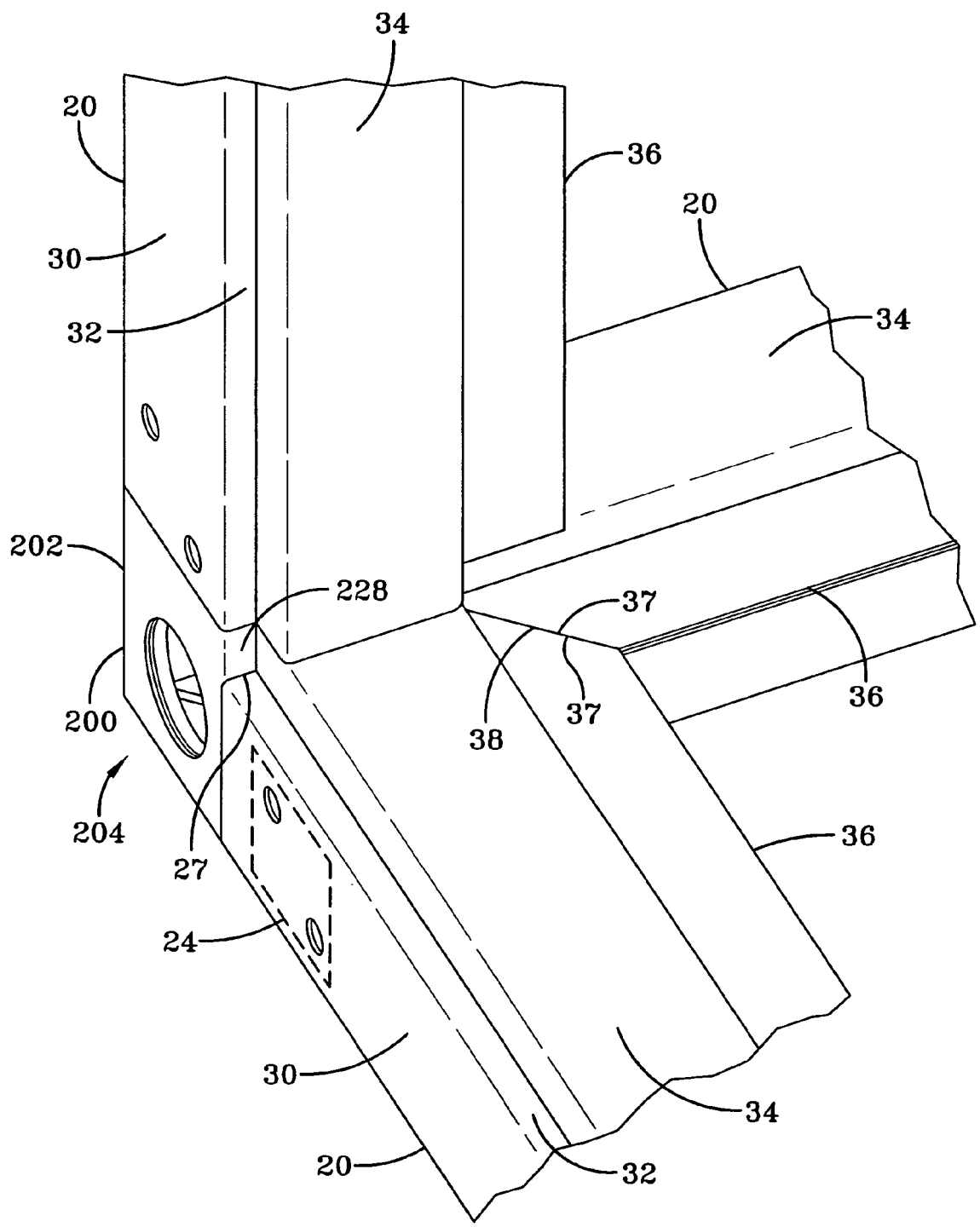
FIG. 9 is an enlarged, perspective view of the assembled corner of the raceway frame of FIG. 8 of the present invention.
Figure 10:
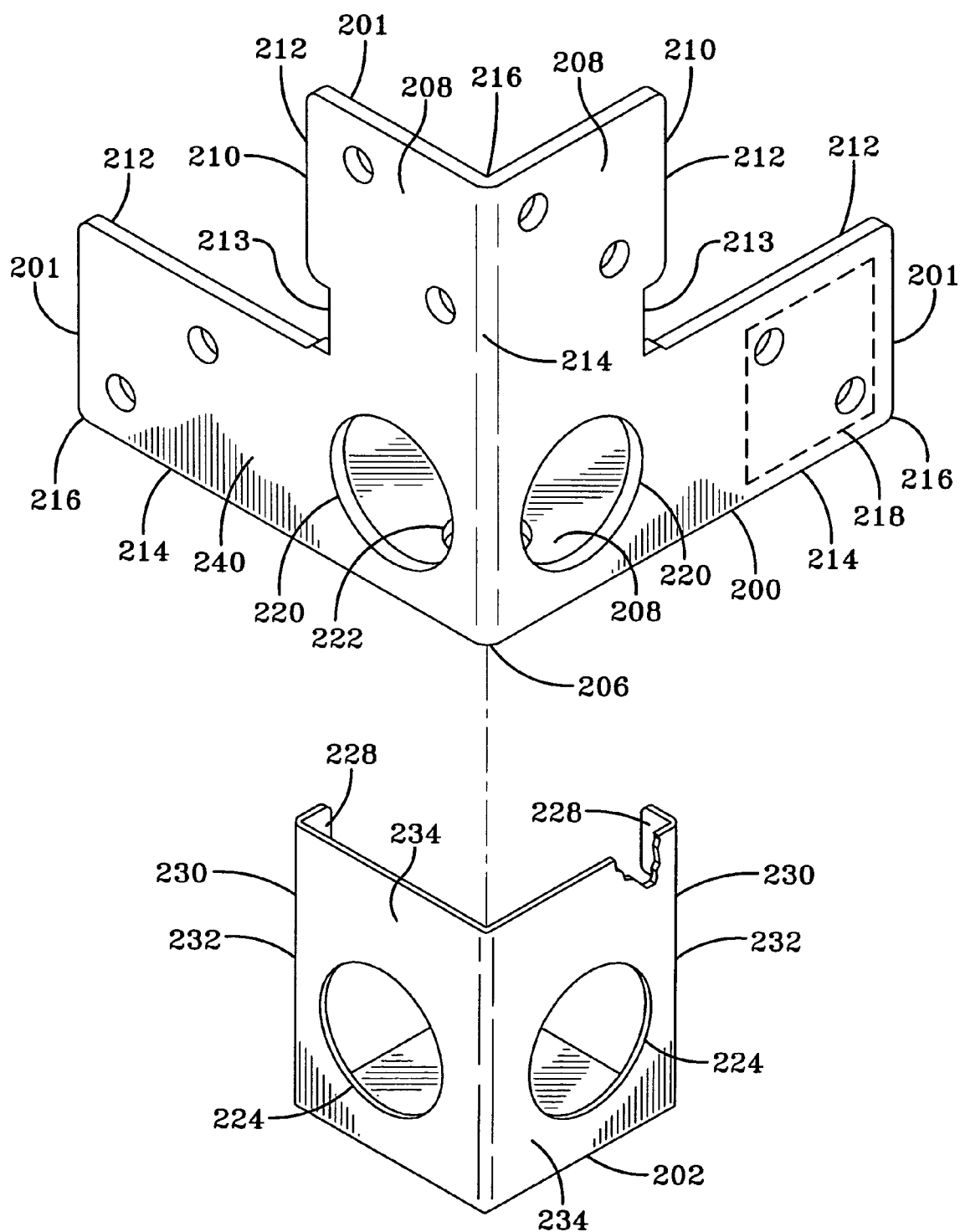
FIG. 10 is an exploded perspective view of a corner assembly of the present invention.
Figure 11:
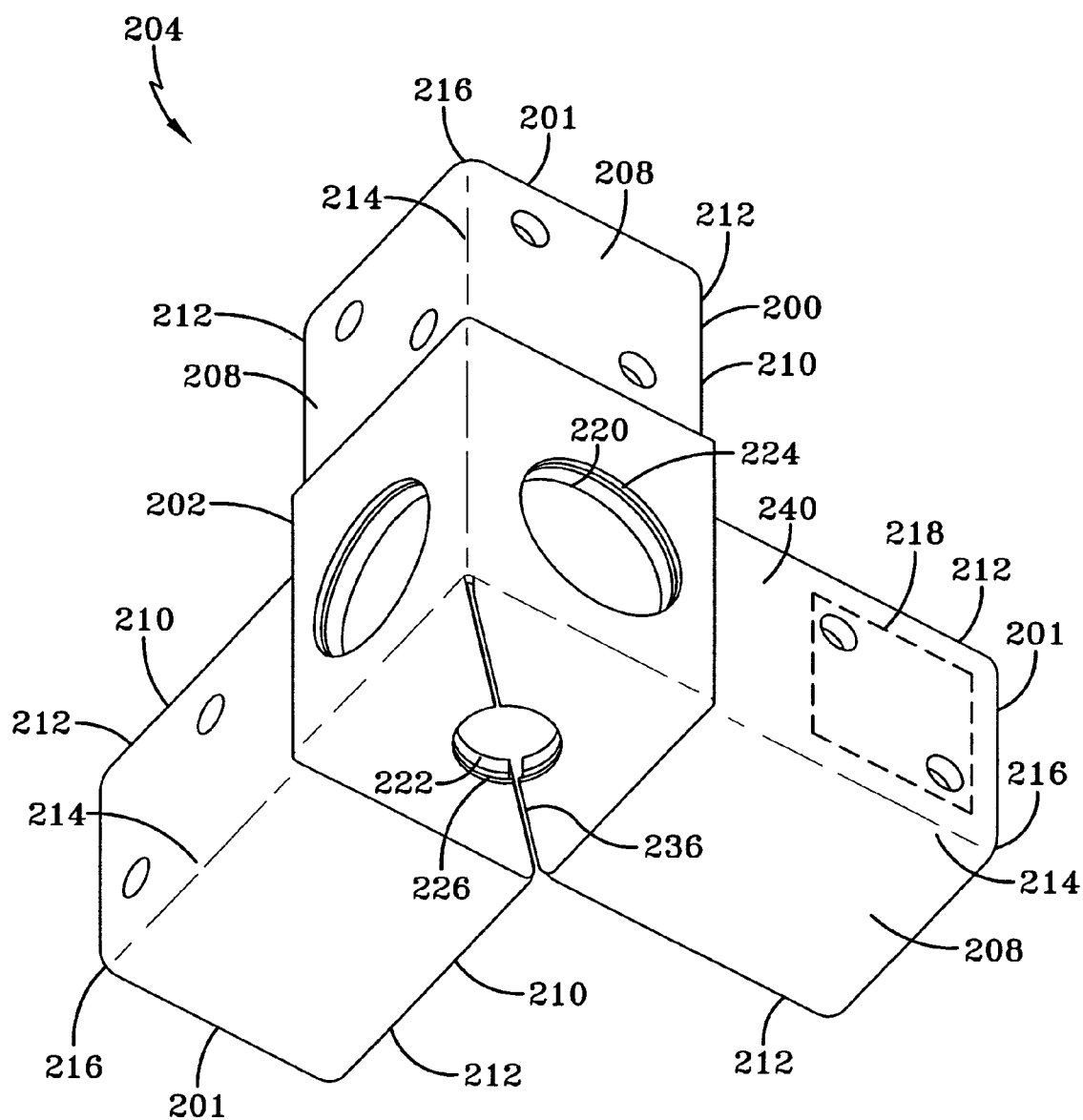
FIG. 11 is a perspective view of the assembled corner assembly of FIG. 10 of the present invention.

Referring to FIGS. 8-9, the continuous peripheral seams or recesses for structurally securing each side of each insulated panel is shown by constructing a corner of a structural frame using three raceways 20 interconnected by corner assembly 204 which is comprised of a corner member 200 that is overlaid by a corner cap member 202. Upon assembly of raceways 20 to corner assembly 204, a continuous second recessed portion 32 is formed along two of the raceways 20, although at a corner 27 of the second recessed portion 32, a tab 228 of corner cap member 202 provides the "bridge" between the junction of two raceways 20 to ensure the second recessed portion 32 is, in fact, continuous. To provide a continuous seam along the flange portion 36 of adjacent horizontal raceways 20, it is necessary to provide chamfered edges 37, which result in an edge portion 38.

Referring to FIG. 4, raceway frames 22 provide a substantially fluid tight seal between each external skin 316 of insulated panel 300 and each corresponding first and second recessed portion 28, 32 by a layer of resilient gasket material 324, such as a closed cell foam gasket or any similar resilient material that is compatible for use with AHUs that functions in a similar manner. Gasket material 324 preferably has a single side adhesive layer which is applied to the portion of first and second recessed portion 28, 32 of raceway frame 22 that physically contacts external skin 316. Applying the single-side adhesive layer of the gasket material 324 against the corresponding recess of the raceway frame not only secures the gasket material 324 to the raceway frame, but permits convenient, non-marring removal of the insulated panel 300 from the raceway 22. Fasteners, such as sheet metal screws (not shown) are installed at predetermined increments as required with the fastener collectively passing through the external skin 316, gasket material 324, and the corresponding first recessed portion 28 or second recessed portion 32. By applying a predetermined range of torque to install the fastener, the external skin 316 and the corresponding first recessed portion 28 or second recessed portion 32 are brought together sufficiently to subject the gasket material 324 to a compressive load such that a substantially leak tight seal is achieved.

Referring to FIGS. 2-4 and 27, flange portion 36 provides a closed geometry for raceway 20. This closed geometry provides the raceway 20 with enhanced stiffness and strength while maintaining a lightweight construction. To further strengthen and stiffen the raceway, the two overlapping layers of material comprising the flange portion 36 of the raceway 20, preferably stainless steel, are preferably fixedly joined together, such as by weld, adhesive or chemical bond, fastener, clamp or other method known in the art, either continuously or at predetermined intervals along its length. Flange portion 36 may be employed to provide additional structural support for insulated panel 300, or an insulated roof assembly 400 which is discussed in further detail below, when the insulated panel 300 is used as a top panel or ceiling (FIG. 4). Alternately, further referring to FIG. 4, flange portion 36 may be employed to provide additional support when the insulating panel 300 is used as a bottom or floor panel. However, to support a floor panel, fasteners (not shown) may be installed through the flange portion 36 and then through a fixture 302 of insulating panel 300, if desired. Other methods may be used to secure flange portion 36 to fixture 302 of insulating panel 300, although non-permanent methods such as fasteners are preferred to permit disassembly and removal of the insulating panel 300. It is appreciated that in addition to providing structural support, flange portion 36 provides an opportunity for a supplemental seal between raceway 20 and insulated panel 300, especially if sufficient proximity between the surface of insulated panel 300 and flange portion 36 is achieved, such as when a layer of gasket material 324 is applied between fixture 302 and flange portion 36 to bridge the gap there between.

Figure 27:
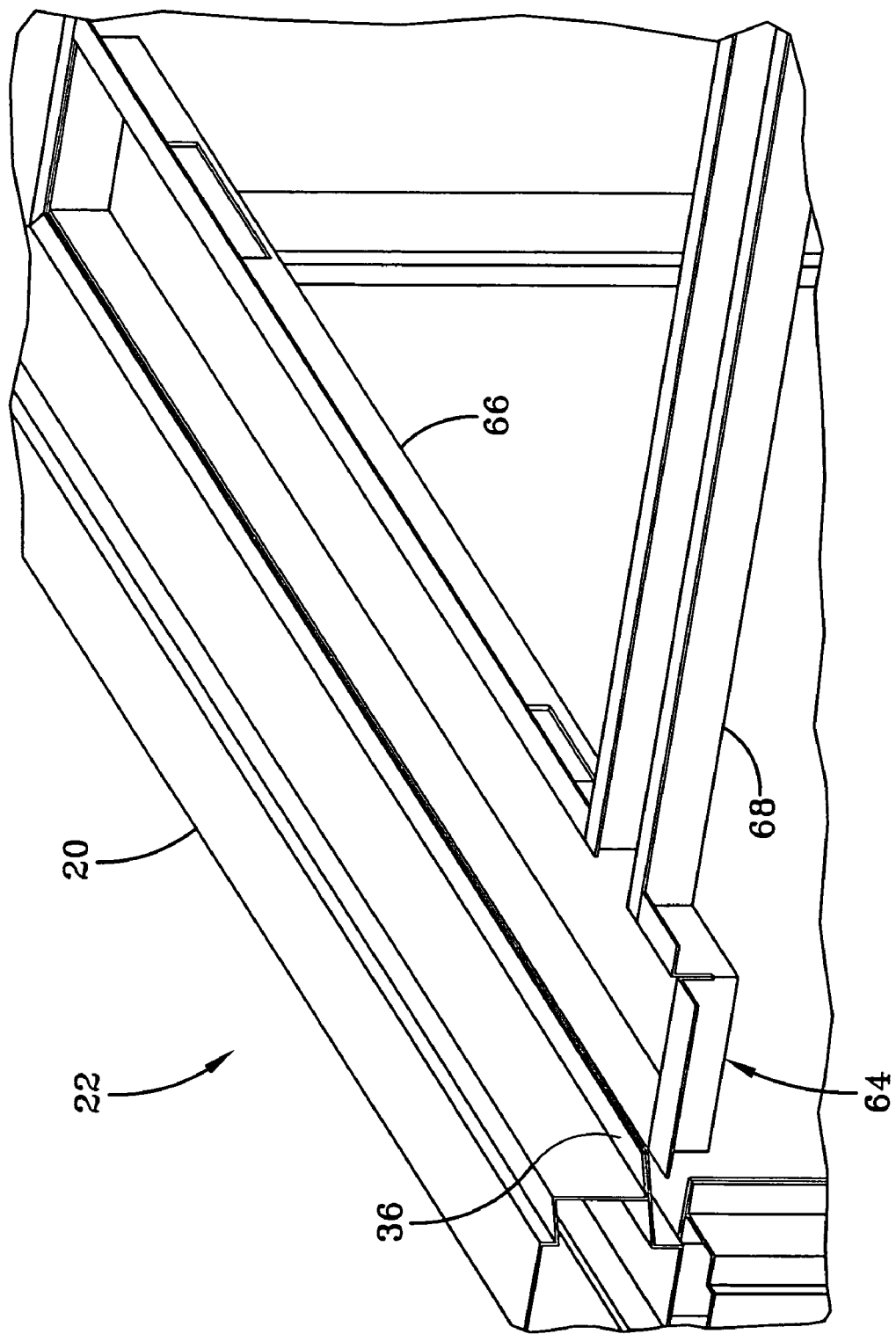
FIG. 27 is a partial perspective view of raceways of a raceway frame supporting wire ways of the present invention.
Figure 28:
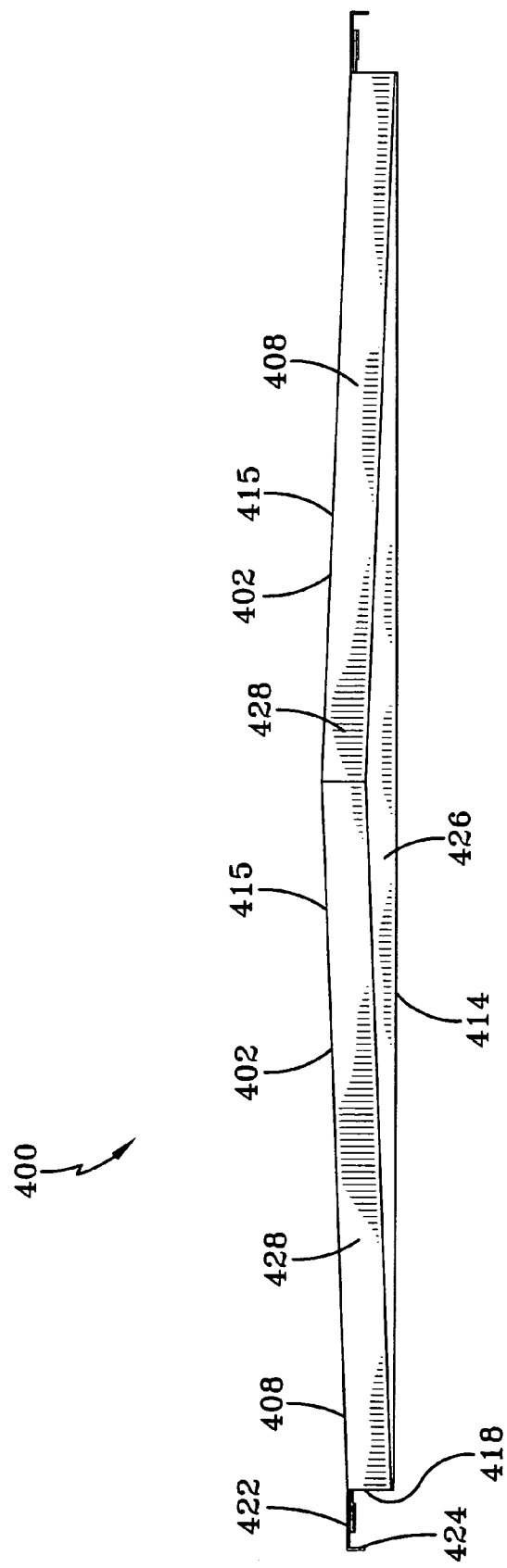
FIG. 28 is an elevation view of the sloped roof assembly of FIG. 18 of the present invention.

Referring to FIG. 27, flange portion 36 of raceway 20 also structurally supports internal AHU components, such as wire ways 64, which comprise flanged trough members 66 that likewise support flanged channels 68 that typically extend transverse to flanged trough members 66. Wire ways 64 can provide convenient, non-intrusive access for electrical wiring or other small, flexible connections for use with the AHU. By supporting the wire ways 64 beneath the flange portions 36 of the upper horizontal raceway frame 22, access problems that may be otherwise encountered when servicing the AHU are minimized.

Figure 5:
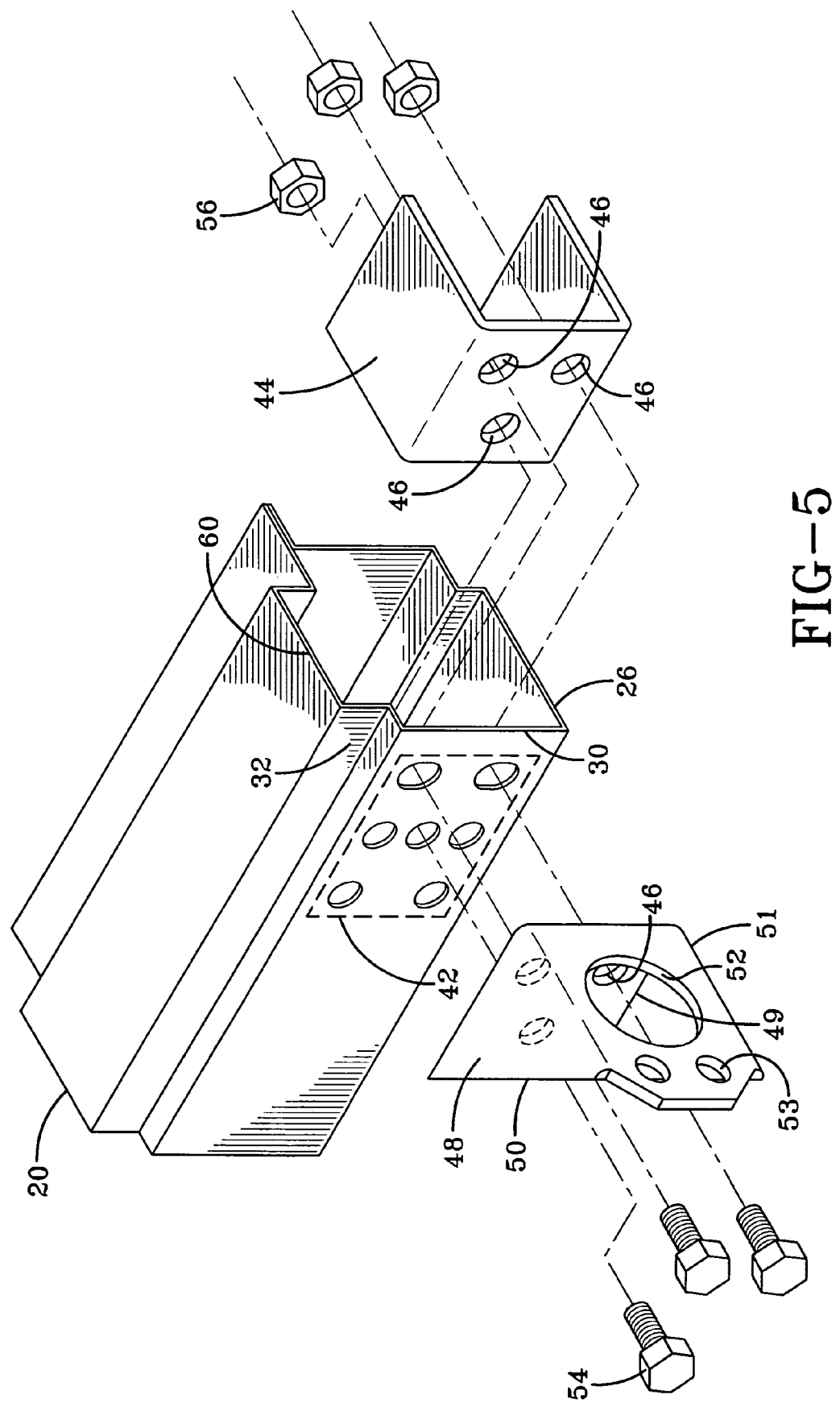
FIG. 5 is an exploded perspective view of one end of a raceway split and lifting lug components of the present invention.
Figure 6:
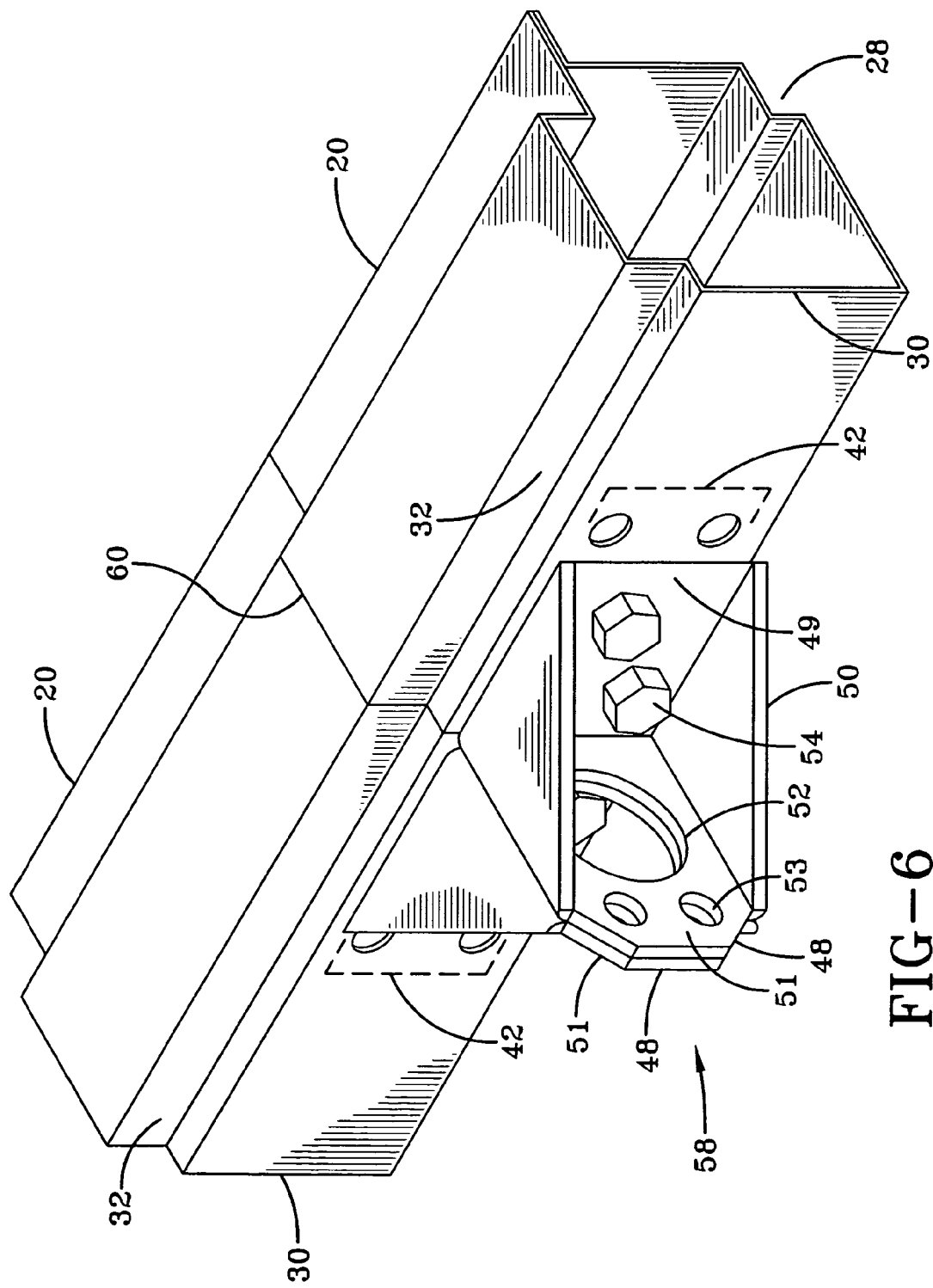
FIG. 6 is a perspective view of an assembled raceway split and lifting lug components of the present invention.
Figure 7:
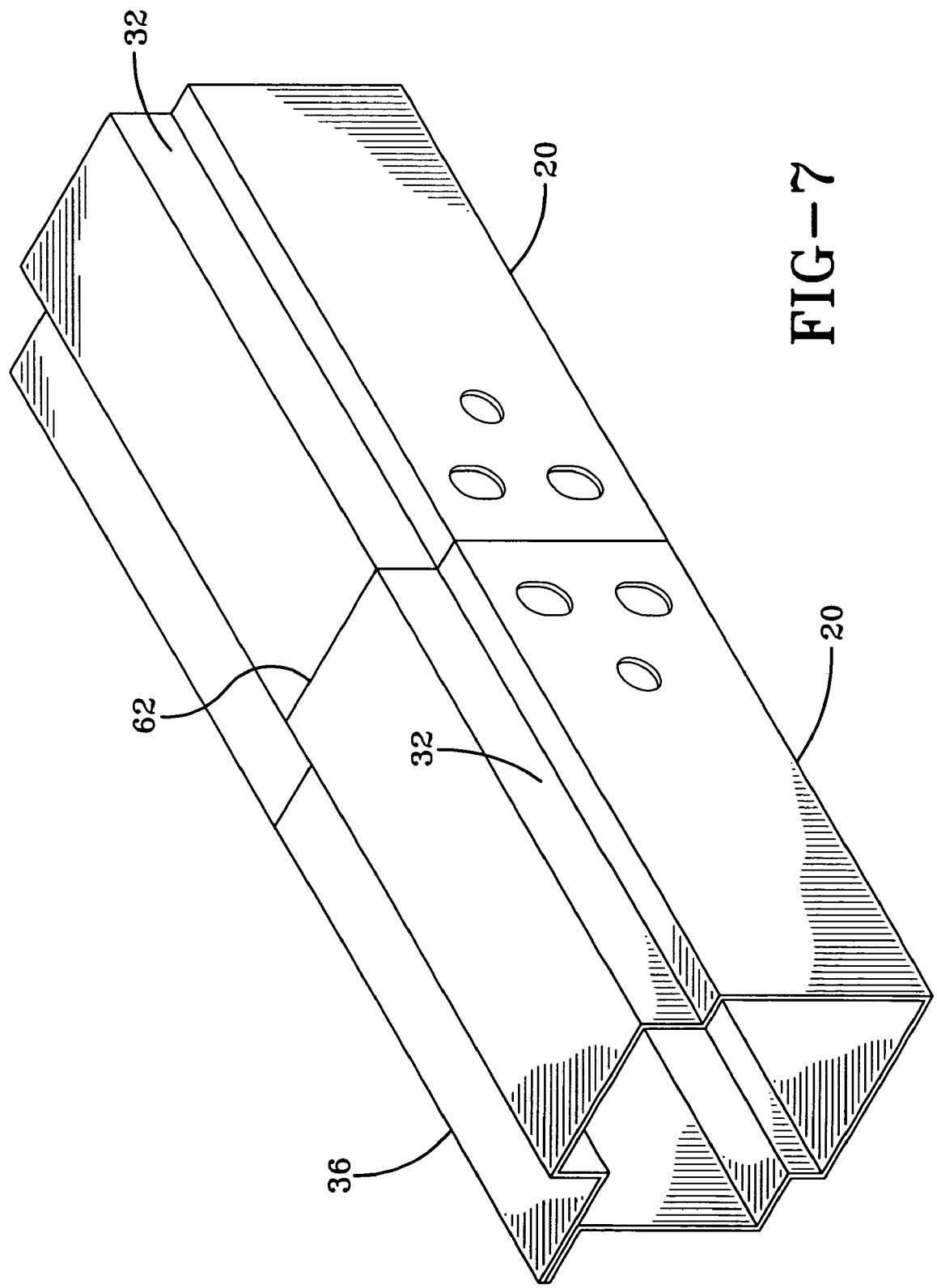
FIG. 7 is a perspective view of an assembled raceway splice of the present invention.

Referring to FIGS. 5-7, due to size constraints, typically related to maximum shipping dimensions for transport by truck, it is often necessary to sever ends of the raceways, or to provide shortened raceways in anticipation of shipping, which severed or discontinuous ends formed in the raceways being referred to as "splits." Such splits interrupt the structural integrity of the raceways. However, due to the enhanced structural strength of the raceways, which result from both the closed geometry profile of the raceways, but also the use of metal, preferably stainless steel, to construct the raceways, structural fittings may be attached adjacent to a split line 60. In other words, the split line of the raceways of the present invention may be utilized to attach structural fittings for use with lifting at least the portion of the AHU structure that has been "split," and may be used to help lift the entire AHU when assembled with these structural fittings.

A universal aperture arrangement 42 is formed adjacent the split line 60 of the raceway 20 that is compatible with the structural fittings. Preferably, the raceways 20 involved with lifting are located along the lower horizontal frame. A reinforcing member 44, preferably resembling a "C" is directed into the end of raceway 20 corresponding to split line 60 and slid into raceway 20 until the apertures 46 formed in reinforcing member 44 are aligned with the corresponding apertures in universal aperture arrangement 42. A lifting lug half 48 which is preferably structurally reinforced by gussets 50, has apertures 46 formed in lifting lug half 48 that are also compatible with universal aperture arrangement 42. Once apertures 46 of lifting lug half 48 are directed into alignment with previously aligned apertures of reinforcing member 44, a fastener 54, such as a bolt, is directed through the aligned apertures such that fastener 54 collectively passes through lug half 48, raceway 20 and reinforcing member 44. A fastener retainer 56, such as a nut, is directed into threaded engagement with fastener 54, and the remaining fasteners 54 and fastener retainers 56 are similarly installed to a predetermined torque such that a portion of raceway 20 adjacent split line 60 is structurally reinforced between gusset 50 and reinforcing member 44. Alternately, reinforcing member 44 may be elongated to structurally bridge between two abutting raceways 20, which reinforcing member 44 further having a second set of apertures 46 to align with the universal aperture arrangement 42 of the second raceway 20 to provide a stronger joint for lifting the AHU portion or entire AHU 10. To provide lifting access, lifting lug half 48 or combined lifting lug 58, which is two abutting lifting lug halves 48 (FIG. 6), an enlarged lug aperture 52 is formed in lifting lug half 48 for receiving a fitting, such as a shackle (not shown) attached at the end of a chain or cable that is associated with a lifting device such as a crane (not shown) and other related lifting hardware intended to more evenly distribute the aggregate load of the AHU, such as spreader bars. Alternately, it may be desirable to join abutting raceways along a splice line 62 by simply placing a peripheral weld along splice line 62 (FIG. 7).

Although the universal aperture arrangement 42 is preferably formed adjacent the split lines 60 of the raceways 20, it is appreciated that the universal aperture arrangement 42 is also compatible with the aperture arrangement 24, such that the universal aperture arrangement 42 may be used with all structural fittings, if desired.

To increase the efficiency of the heating and cooling system, raceways 20 can be injected with insulating material (not shown). Since the insulating material is preferably applied to substantially completely fill the interior of the raceways, the formation of condensation in the raceway, which is a major cause of corrosion, is likewise significantly eliminated.

Referring to FIGS. 8-13, an orthogonal corner of the frame structure of AHU 10 is formed by receiving one end of three different raceways 20 in corner assembly 204 (FIG. 8), each of the three raceways 20 being secured to the corner assembly 204 in a mutually perpendicular arrangement. The corner assembly 204 further provides identical, continuous joints with each of the raceways 20 (FIG. 9). The corner assembly 204 comprises a corner member 200 that is coupled with a corner cap member 202. Corner member 200 is preferably of unitary construction, having common aperture arrangements 218 formed in orthogonally arranged portions 201 of corner member 200 that are compatible with aperture arrangements 24 formed adjacent ends 25 of raceways 20, whereby the corner members 200 and raceways 20 define the frame structure for the AHU. In other words, due to the aperture arrangements 218 in the corner member 200 being compatible with the aperture arrangements 24 in the raceways 20, any end 25 of raceway 20 can be secured to any corresponding portion 201 of corner member 200. However, to ensure continuous joints with each of the raceways are achieved, the aperture arrangement 218 formed in the vertically oriented portion 201 of corner member 200 can be configured such that the vertically oriented portion 201 only mates with the aperture arrangement 24 of a vertically oriented raceway 20. Similarly, the aperture arrangement 218 formed in opposed horizontally oriented portions 201 of corner member 200 can be configured such that the horizontally oriented portion 201 only mates with the aperture arrangement of a horizontally oriented raceway 20.

Figure 12:
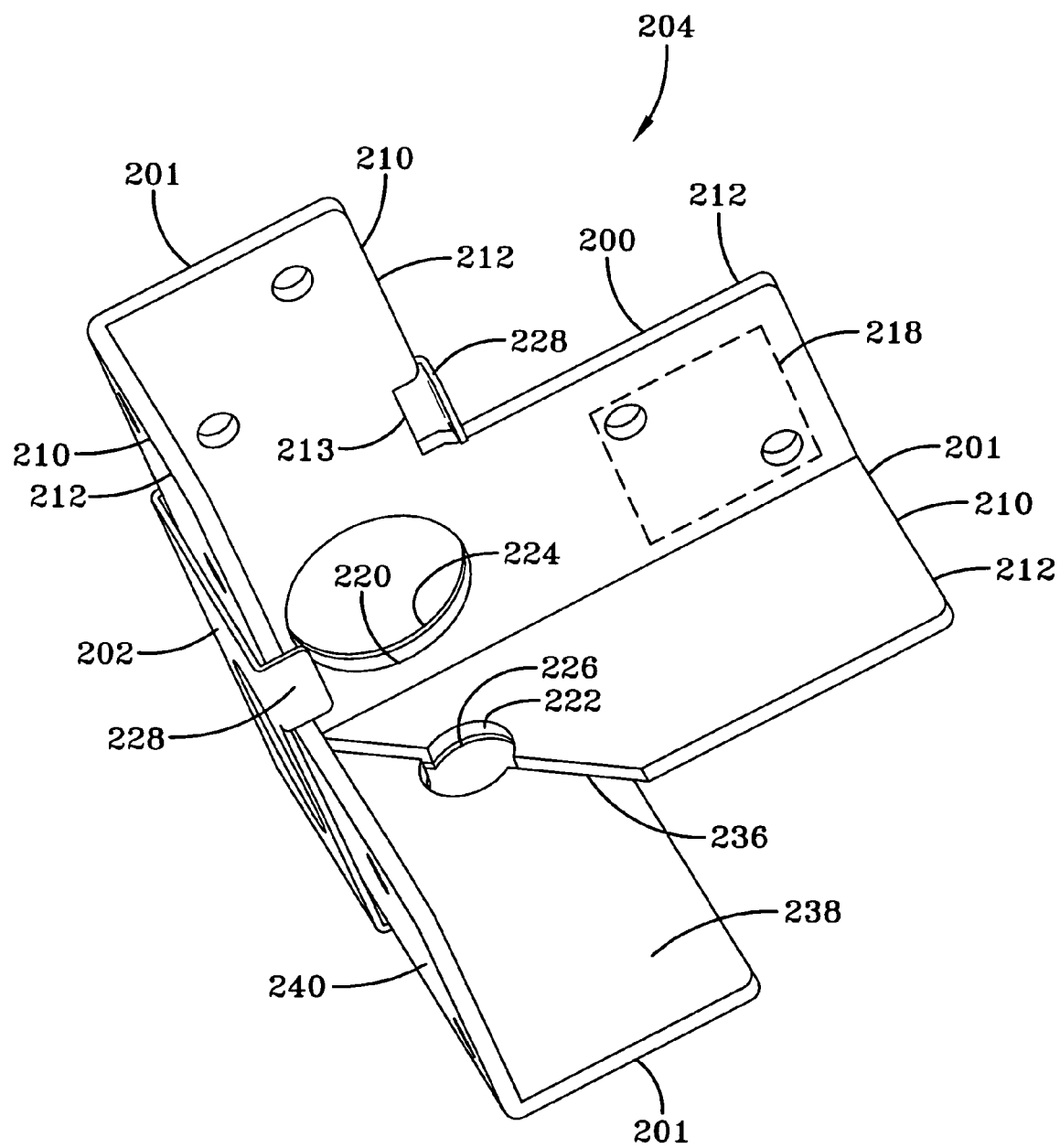
FIG. 12 is a rotated perspective view of the assembled corner assembly of FIG. 11 to show the tabs of the corner cap member of the present invention.

Once corner member 200 is formed, such as by bending a metal flat pattern, corner member 200 forms a common corner point 206 that extends into three substantially orthogonal surfaces 208. Each of the three orthogonal surfaces 208 defines an L-shaped portion 210, with each L-shaped portion 210 having two legs 212 of substantially equal length. Each leg 212 of one L-shaped portion 210 connects to one leg 212 of each of the other L-shaped portions 210, each connection between adjacent legs 212 defining an edge 214. In a preferred embodiment, one L-shaped portion 210 is comprised of two opposed halves brought together as a result of bending a single piece of sheet metal, the two pieces being separated by a gap 236 (FIG. 12). If desired, gap 236 can be welded or joined together by methods known in the art. Corner member 200 preferably defines three mutually perpendicular edges 214 that terminate at common corner point 206. Thus, the end 216 of each edge 214 that is opposite the common corner point 206 terminates at the ends of adjacent legs 212 which are perpendicular to each other, the legs 212 providing two perpendicular, or orthogonal, surfaces 208.

While legs 212 of corner member 200 are preferably identical, a pair of recesses 213 are formed adjacent the juncture of the legs 212 of adjacent L-shaped portions 210 for use with corner cap member 202 which will be discussed in further detail below. Aperture arrangements 218 are formed in each leg 212 adjacent end 216 of edge 214. Collectively, the portion of adjacent legs 212 defining perpendicular surfaces 208 that are connected by corner 214, including aperture arrangements 218 adjacent end 216, comprises an orthogonal portion 201 of corner member 200. Thus, corner member 200 has three orthogonal portions 201, each orthogonal portion 201 for structurally receiving one end of raceway 20. Thus, referring back to FIG. 8, an end 25 of each raceway 20 is directed over a corresponding orthogonal portion 201 of corner member 200 along a corresponding edge 214 to form a connection. The connection that is formed between each raceway 20 and the two perpendicular surfaces 208 defined by orthogonal portion 201 of the corner member 200 is secured by fasteners (not shown) being directed through respective, mutually aligned aperture arrangements 24, 218. This connection between the raceways 20 and the corner member 200 is of sufficient strength to serve as a lifting point for the AHU.

To provide convenient lifting access of the corner member 200, a pair of enlarged lifting apertures 220 are formed along the respective junctions of adjacent L-shaped portions 210 which are likewise positioned adjacent common corner point 206. Lifting apertures 220 are configured to readily receive a lifting shackle or other conventional lifting fitting for ease of transport of the assembled framed structure. In addition to the lifting apertures 220 which are each formed in a different orthogonal surface 208, a tooling aperture 222 is formed in the remaining orthogonal surface 208 adjacent the juncture of the corresponding L-shaped portion that is adjacent common corner point 206. Tooling aperture 222 is configured to receive a fitting on a tooling structure (not shown) to assist with fabrication of the framed structure.

Corner cap member 202 is preferably of unitary construction, such as by bending a metal flat pattern, and when installed over corner member 200 that has been secured to three orthogonally oriented raceways 20, forms a substantially continuous coplanar surface with each of the first and second segments 26, 30 of raceways 20 which are visible outside the framed structure of the AHU. The corner cap member 202 is comprised of three interconnected, orthogonal, rectangular portions 232 having orthogonal surfaces 234. An enlarged aperture 224 is formed in each of two adjacent rectangular portions 232, and an aperture 226 is formed in the remaining rectangular portion 232 such that when corner cap member 202 is installed over corner member 200, the apertures formed in the corner cap member 202 are substantially coincident with the apertures formed in the corner member 200. In other words, the pair of lifting apertures 220 and the tooling aperture 222 formed in corner member 200 remain accessible after the corner cap member 202 is installed over the corner member 200. A pair of substantially rectangular tabs 228 protrude from upper portions of adjacent rectangular portions 232 toward each other in a direction perpendicular to its respective surface 234 so that when the corner cap member 202 is installed over corner member 200, tabs 228 are received adjacent recess 213 of corner member 200 (FIG. 12). When corner cap assembly 204 is connected to three raceways 20 (FIG. 9), tab 228 ensures second recessed portion 32 adjacent corner 27 is continuous.

Figure 13:
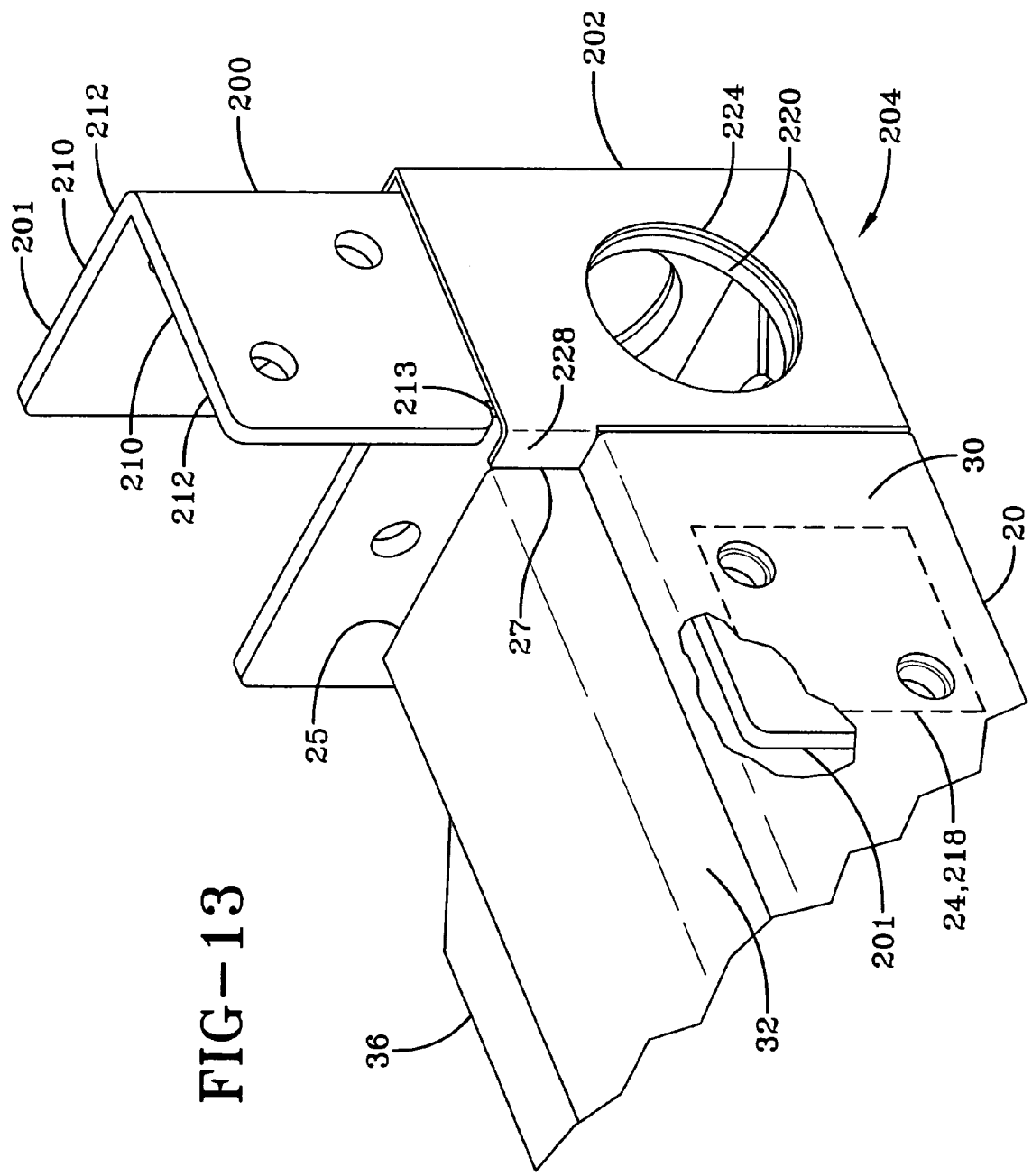
FIG. 13 is an enlarged perspective view of a raceway connected to a corner assembly of the present invention.
Figure 14:
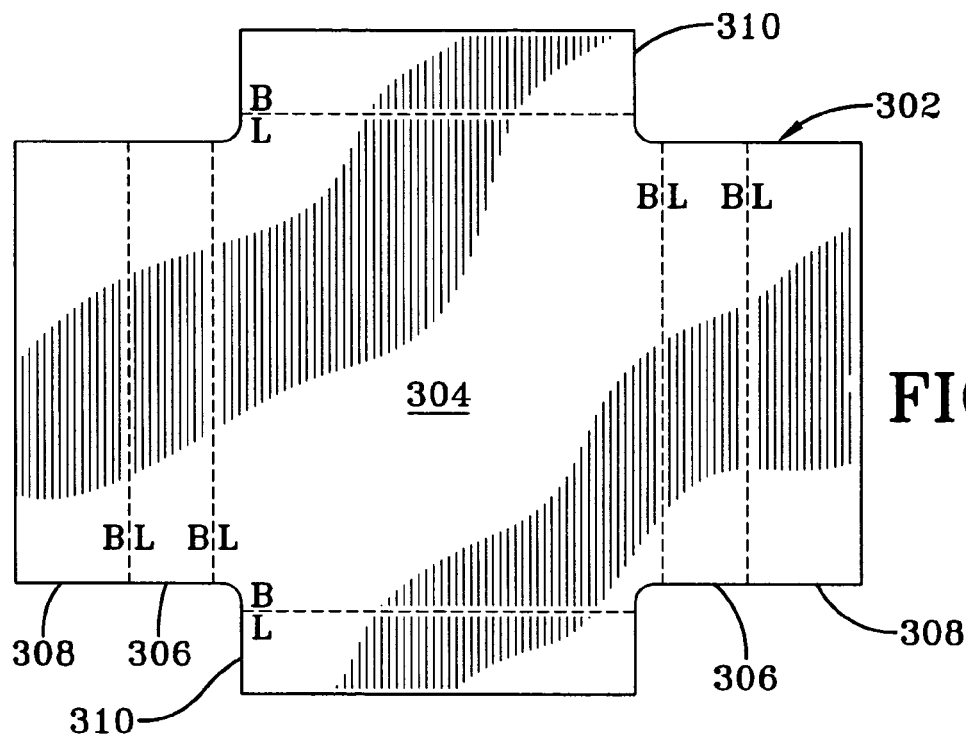
FIG. 14 is a sheet metal flat pattern of a fixture of an insulated panel of the present invention.
Figure 15:
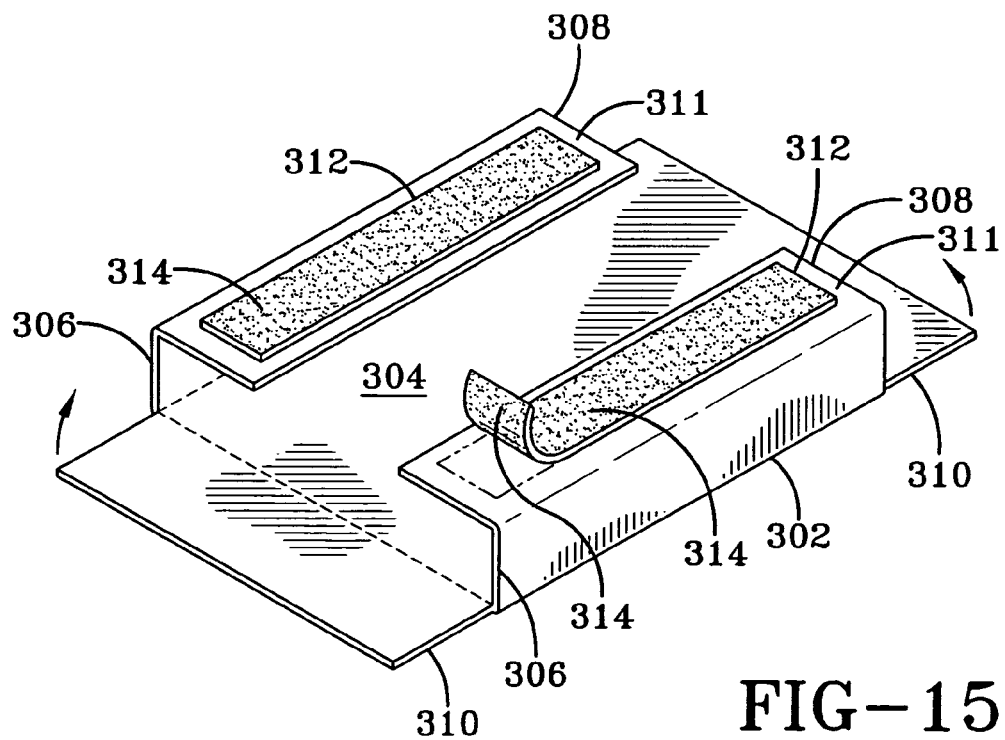
FIG. 15 is a perspective view of the partially fabricated fixture of FIG. 14 of the present invention.

Rectangular portions 232 of corner cap member 202 are sized to cover the corresponding substantially rectangular portions of the orthogonal surfaces 208 of the corner member 200 that remain exposed after the raceways 20 have been secured to the corner member 200. Similarly, tabs 228 of corner cap member 202 are sized to cover the exposed portions of first and second recessed portions 28, 32 remaining after the orthogonally oriented raceways 20 are connected to the corner member 200. Thus, by covering the exposed portions remaining after the raceways 20 are connected to the corner member 200, the raceway surfaces and recesses along abutting raceways are substantially continuous. If desired, the seams defined by the assembly of the raceways 20 with the corner assembly 204 can be welded, including the seam around the periphery of tab 228 (FIG. 13).

Referring to FIGS. 14-17 insulated panel 300 is provided for insertion in the first and/or second recessed portions 28, 32 formed along the raceways 20 that are interconnected by connectors to form framed structures used with AHUs. Insulated panel 300 of the present invention is constructed using a minimum of parts and may be sized according to a customer's individual needs to define any number of different aspect ratios and dimensions, preferably down to at least one inch increments, while still complying with structural stiffness standards as well as assembled air leakage standards. Additionally, a single panel construction may be employed irrespective the location of the panel in the AHU. That is, ceiling, wall and floor panel constructions are the same.

Fixture 302 is preferably constructed of sheet metal, although other materials for use in HVAC systems that are sufficiently formable or moldable with sufficient strength may also be used. Fixture 302 comprises a centrally positioned base 304 having opposed risers 306 extending from sides of base 304 in a direction perpendicular to base 304, which risers 306 further extend to inwardly directed coplanar flanges 308, and opposed ends 310. When opposed ends 310 are rotated into a desired position, which is substantially perpendicular to base 304, the assembled fixture 302 resembles a rectangular block with an opening into the block due to the space between opposed flanges 308. A layer of foam tape 312, such as polyethylene tape, having opposed adhesive layers 314 is applied along outside surface 311 of each flange 308 for bonding fixture 302 to the exterior skin 316. This foam tape 312 also has a low thermal conductivity, and serves as a thermal barrier to conduction. Alternately, other bonding methods or materials may be employed having similar physical properties. Exterior skin 316, which is preferably a substantially flat rectangular plate, is then positioned over fixture 302, the length of overhang 318 between the ends of the exterior skin 316 and the corresponding sides and ends of the fixture 302 preferably being substantially the same. In other words, the fixture 302 is preferably substantially centered with respect to the exterior skin 316. Once the exterior skin 316 is bonded to the fixture 302 by virtue of the tape 312, the assembled exterior skin 316, tape 312 and fixture 302 collectively define a closed interior chamber 320 for receiving insulating material 322 therein.

The insulating material 322 is injected by an injection gun (not shown) inside the chamber 320 through apertures (not shown) formed in the exterior skin 316 using a specially configured press to ensure the fixture 302 and the exterior skin 316 are sufficiently supported against the force of the insulating material 322 that is injected at an elevated pressure level. The volume of the chamber 320 is calculated prior to the injection operation. A precise amount of insulating material 322 is injected into the chamber 320 by correcting for the ambient conditions at the time of injection as it is desirable to completely fill the chamber 320 with insulating material 322. Since the flow rate of the injected insulating material 322 through the injection gun is a known value, the duration of flow is the variable parameter which is precisely controlled to achieve the proper amount of injected insulation material 322. To provide a favorable bonding interface between the inner surfaces of the chamber 320 and the expanding, injected insulating material 322, the press platens that secure the exterior skin 316 are heated, preferably up to about 100° F. Once the injection process is completed and the injected insulation material 322 has cured, the insulated panel 300 is installed in the AHU frame structure.

Four raceways 20 joined by corner members 200 collectively define a raceway frame 22 that surrounds and supports each insulated panel 300. To prepare the raceways 20 for installation of the insulated panel 300, a layer of single sided adhesive foam tape 324 (FIG. 4) is applied to each of the four first and/or second recessed portions 28, 32 along each of the four raceways 20 surrounding and supporting the insulated panel 300. The first and second recessed portions 28, 32 define a recessed periphery for sealingly securing the insulated panel 300 therein. Single sided adhesive tape 324 is used to permit the insulated panel 300 to be easily removed from the raceway frame 22. The insulated panel 300 is then installed into the raceway frame 22, the first and second recessed portions 28, 32 of the raceways 20 being configured such that the overhangs 318 of the exterior skin 316 are brought into physical contact with the recessed peripheral surfaces defined by the first and second recessed portions 28, 32 formed in the raceways 20. The installation of insulated panel 300 is the same irrespective the orientation of the installed insulated panel 300. In other words, installations of a top panel, a side panel or a bottom panel are identical. Once the overhangs 318 of the insulated panel 300 are brought into physical contact with the recessed periphery defined by the first and second recessed portions 28, 32 formed in the frame structure, removable fasteners (not shown), such as sheet metal screws, are installed at intervals along the overhang 318 using a predetermined range of installation spacing to provide support and a substantially fluid tight seal between the overhang 318 of the exterior skin 316 and the first and second recessed portions 28, 32 of the raceway frame 22.

The construction of the insulated panel 300 of the present invention is lightweight, yet extremely strong. Due to the increased stiffness and strength, panels may preferably be fabricated up to at least 60 inches in width, which is a significant improvement over the 48 inches employed in known insulated panel constructions, and lengths up to about 120 inches can be fabricated, while meeting current strength/deflection requirements.

Referring to FIGS. 18-20 and 28-29, insulated roof assembly 400 provides a sloped roof surface for use with AHU structures of the present invention to prevent the formation and accumulation of standing water on the top of the AHU structures which are installed outside and subjected to the rigors of environmental exposure, such as rain or snow. Insulated roof assembly 400 is preferably of unitary construction comprising two sloped halves 402 abutting along the mid span 404 of the roofline, typically referred to as the peak of the roof. Each sloped half 402 includes a fixture 406 and an exterior skin 408, similar to that previously discussed for insulating panel 300.

Fixture 406 is preferably of unitary construction and comprises a base 407 which forms a substantially coplanar surface that defines a horizontal ceiling 414 when roof assembly 400 is installed over the AHU frame structure, which frame structure possibly including several interconnected raceway frames 22. Base 407 extends outwardly to opposed ends 418, which ends 418 extend toward exterior skin 408 in a direction that is preferably substantially perpendicular to base 407. Ends 418 further extend to outwardly extending opposed flanges 419 that are secured to a retaining portion 422 of exterior skin 408 (FIG. 29). The means of bonding flanges 419 to retaining portion 422 may include fasteners, welding, adhesive, or any suitable method of joining two surfaces known in the art. Additionally, base 407 also extends to opposed side flanges 426, which flanges 426 extend toward exterior skin 408 in a direction that is preferably substantially perpendicular to base 407. Flanges 426 are secured to corresponding opposed flanges 428 of exterior skin 408 by any similar method previously described that may be employed to secure flange 419 and retaining portion 422 of exterior skin 408.

Exterior skin 408 is preferably of unitary construction and extends outwardly from mid span 404 defining a pair of sloped surfaces 415 that transition to opposed retaining portions 422, which retaining portions 422 further extend to corresponding retaining flanges 424 that are substantially perpendicular to retaining portions 422. Retaining portion 422 and retaining flange 424 are configured to conformally engage respective portions of first segment 26 and second segment 30 of raceways 20 of raceway frame 22 when roof assembly 400 is installed onto raceway frame 22. In addition to retaining portion 422 and retaining flange 424, portions of fixture 406 also conformally engage corresponding portions of raceway frame 22 when roof assembly 400 is installed onto raceway frame 22. That is, base 407 engages flange portion 36 such that flange portion 36 provides significant peripheral structural support of base 407, end 418 engages third segment 33, and flange 419, which is connected to retaining portion 422 engages first segment 26. In other words, each opposed end of roof assembly 400 adjacent retaining portion 422, collectively engages, at least partially, four different surfaces of the raceway frame 22. If desired, to help render the connection between retaining portion 422 and adjacent surfaces of roof assembly 400 and raceway frame 22 substantially fluid tight, a filler material 430, such as a compatible caulk material, may be applied in and along first recessed portion 28, and may further be applied along first segment 26, second segment 30, third segment 33, and along flange portion 36. Alternately, or additionally, tape, such as butyl tape, may be used to help provide the substantially fluid tight seal.

In addition to exterior skin 408 extending to opposed retaining portions 422, exterior skin 408 also extends to opposed flanges 428 which are substantially perpendicular to corresponding sloped surfaces 415. Flanges 428 overlap and substantially cover corresponding flanges 426 of fixture 406. When roof assembly 400 is installed onto raceway frame 22 (FIG. 19), flange 428 is placed in conformal contact with third segment 33, although a portion of flange 426, which portion that is not physically separated from third segment 33 by flange 428, is both adjacent to and in fluid communication with third segment 33. Further, a portion of base 407 of fixture 406 is also placed in conformal contact with flange portion 36 of raceway frame 22. If desired, to help render the connection between both flange 428 of exterior skin 408, and flange 426 and base 407 of fixture 406, and first recessed portion 28, third segment 33, and flange portion 36 of raceway 20 of raceway frame 22, filler material 430 may be applied in and along first recessed portion 28, third segment 33 and flange portion 36. Preferably, a sufficient amount of filler material 430 is applied in first recessed portion 430 to more than substantially fill first recessed portion 430 such that moisture will not collect and accumulate along first recessed portion 28. In other words, it is preferable to provide a sufficient amount of filler material 430 to establish a sloped region 432 such that moisture flows away by force of gravity from the region above first recessed portion 28. Alternately, skin 408 may be configured to protrude outwardly to provide a retaining portion and retaining flange that is not only similar to retaining portion 422 and retaining flange 424, but preferably continuous with retaining portion 422 and retaining flange 424 so that first segment 26 is entirely covered by this alternate, continuous construction of retaining portions and retaining flanges of roof assembly 400.

Similar to insulated panel 300, roof assembly 400 defines a closed chamber 410 for receiving injected insulating material 412 therein. That is, upon assembling fixture 406 to exterior skin 408, the collective interfacing surfaces including sloped surfaces 415 and flanges 428 of exterior skin 408, and base 407, ends 418, and flanges 426 of fixture 406 define closed chamber 410. For similar reasons of additional stiffness and strength, as well as enhanced insulating properties for insulated panel 300, insulating material 412 is injected inside closed chamber 410 of roof assembly 400 in a manner substantially similar to that previously discussed for insulating panel 300.

Figure 18:
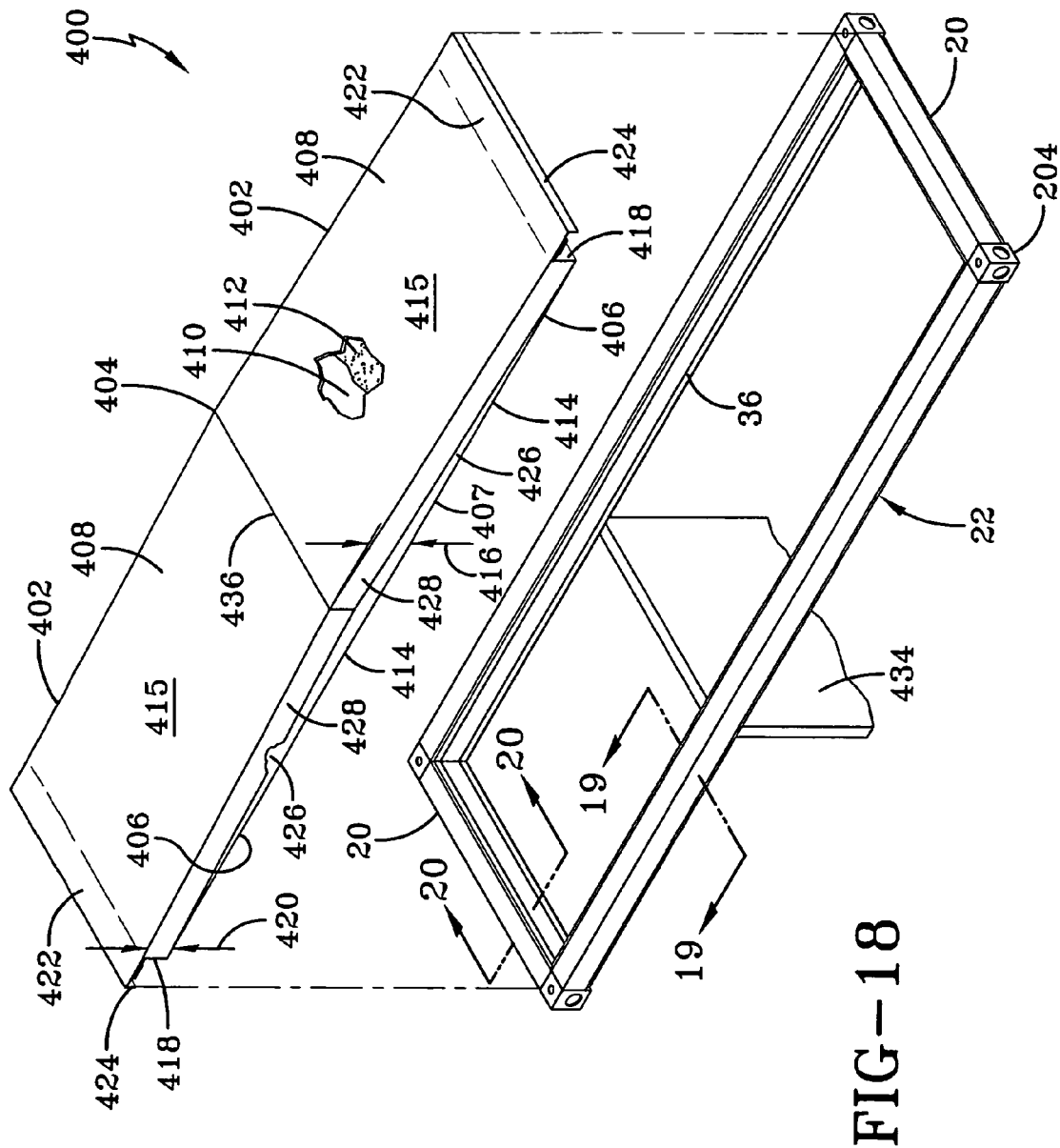
FIG. 18 is an exploded perspective view of a sloped, insulated roof panel prior to assembly with a raceway frame of the present invention.
Figure 19:
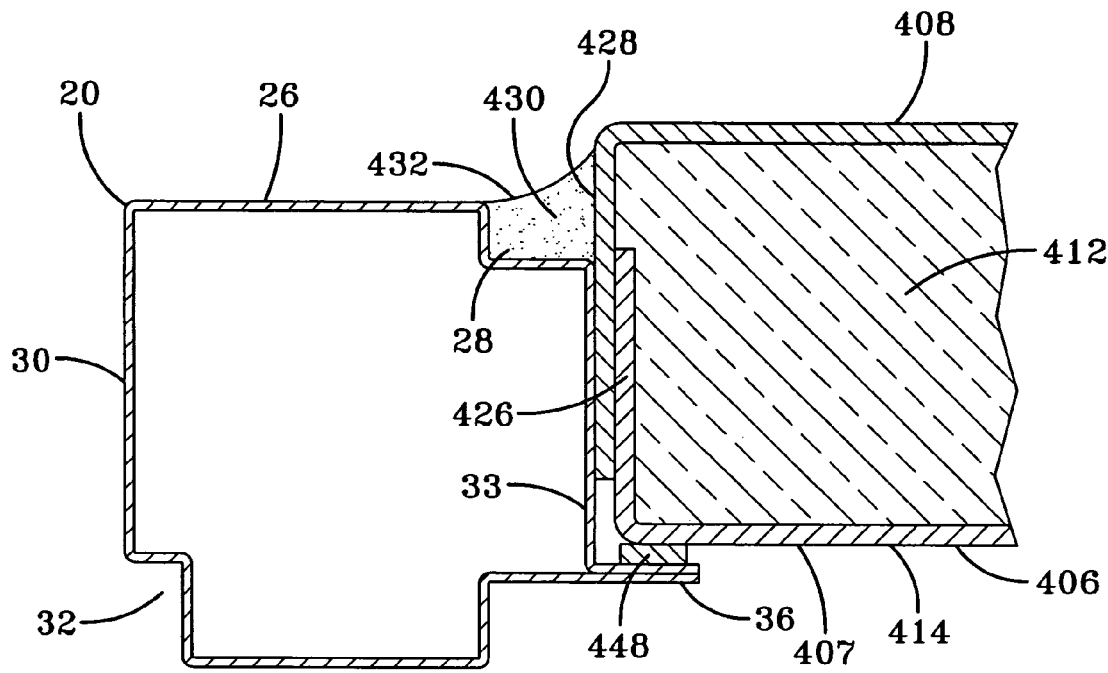
FIG. 19 is a cross section of the assembled insulated roof panel and raceway frame taken along line 19-19 of FIG. 18 of the present invention.
Figure 20:
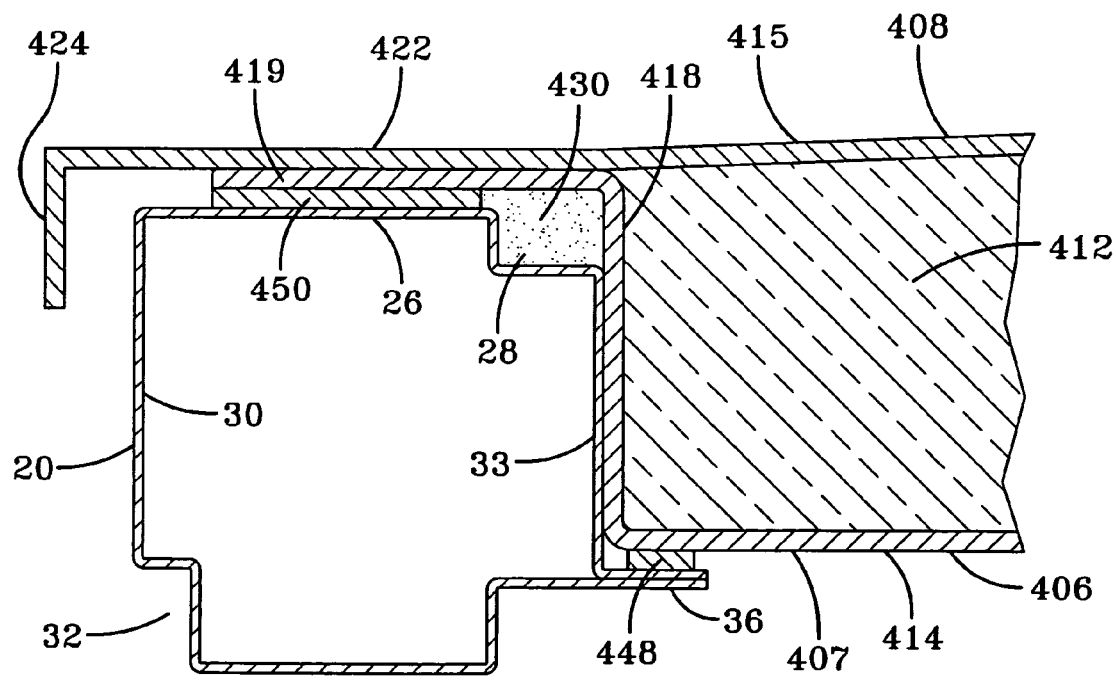
FIG. 20 is a cross section of the assembled insulated roof panel and raceway frame taken along line 20-20 of FIG. 18 of the present invention.

Although the unitary construction of roof assembly 400 has enhanced mechanical stiffness and strength, flange portion 36 of raceway frame 22 provides a significant amount of continuous, vertical support along the periphery of base 407 of fixture 406. Optionally, additional vertical support may be provided for roof assembly 400 by a bulkhead 434 (FIG. 18). Bulkhead 434 is a vertically oriented structural member that is positioned transverse to the direction of forced air flow in an AHU structure. Therefore, the addition of bulkhead 434 provides vertical structural support along a portion of the entire width of roof assembly 400 that coincides with the bulkhead 434 contacting the base 407 of the roof assembly 400, in addition to the peripheral support provided by the flange portion 36.

An important advantage of the roof assembly 400 of the present invention is its unitary construction. While the unitary construction of the roof assembly 400 provides enhanced structural stiffness and strength, flange portion 36 of raceway frame 22 provides significant peripheral, structural support, as well as the additional support provided by an additional bulkhead 434, or even bulkheads 434, as previously discussed. However, if special circumstances require dividing the roof assembly into multiple segments, such as sloped halves 402, a spliced connection (not shown), such as along mid span 404, may be formed to bridge the divided halves 402.

Figure 22:
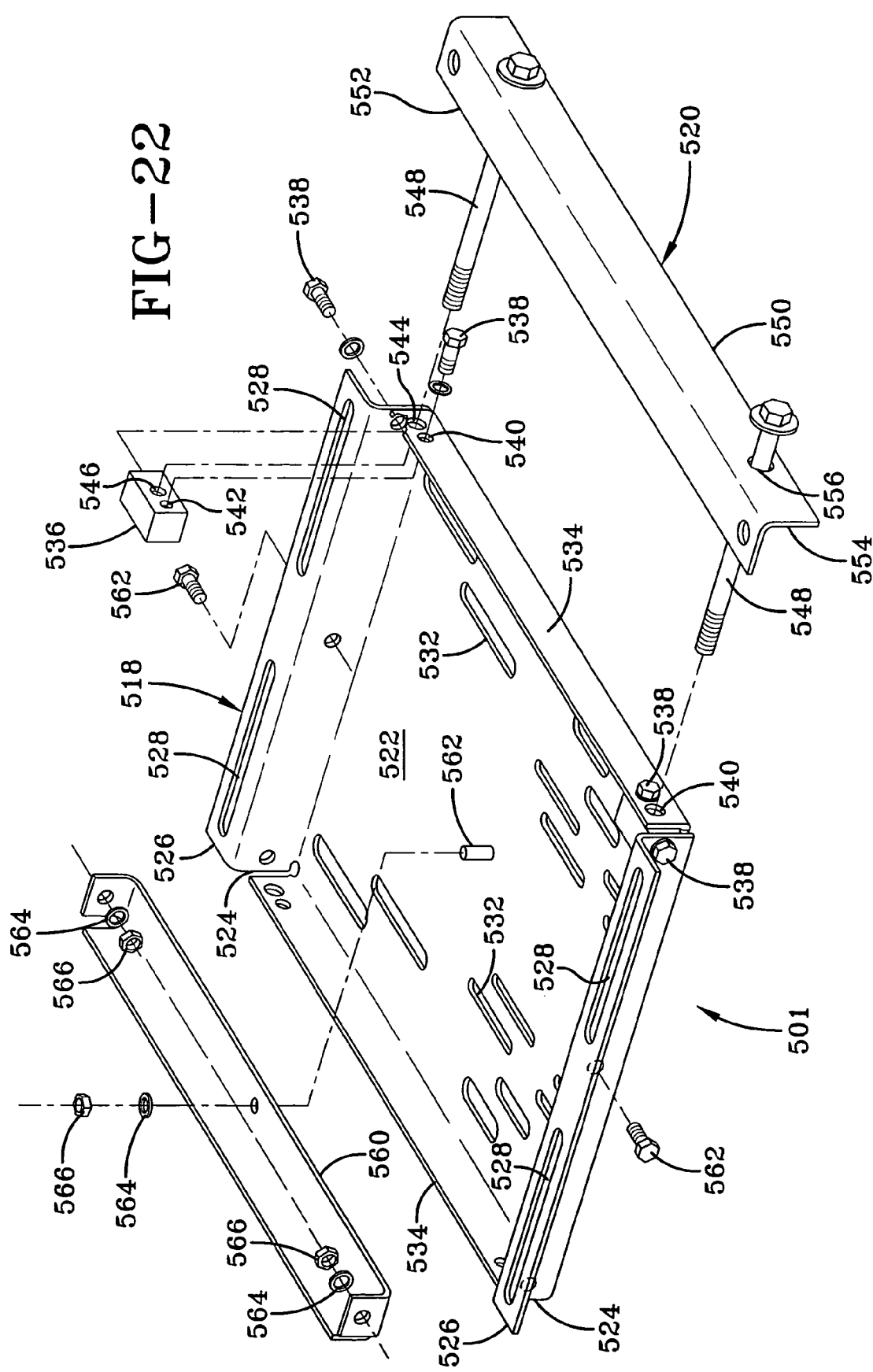
FIG. 22 is an inverted, exploded perspective view of the platform assembly of the present invention.

Referring to FIGS. 21-22, an adjustable platform assembly 500 is provided for achieving easily controlled motor belt tensioning/alignment between a motor 515 and blower 502 within an AHU compartment or housing. Typically, the source of forced air for an AHU is provided by blower 502 having a bladed arrangement that is rotatably carried about a shaft 504 having an axis 511, which blower 502 being secured within the compartment. A sheave 510 that is secured to shaft 504 of the bladed arrangement is typically urged into rotational movement by another sheave 512 which is secured to a shaft 514 of motor 515 by a belt 516 that is maintained in mutual non-slipping frictional contact with the peripheral grooves of sheaves 510, 512. The shaft 514 has an axis 513. For proper operation, sheaves 510, 512 must be maintained in proper alignment with each other and sufficient tension in belt 516. Thus, either motor 515 or blower 502 must be properly positioned with respect to each other to achieve these objectives. Complicating matters is the fact that in an AHU, motor 515 and blower 502 are typically positioned within a compact, closed compartment leaving little room to effect such adjustments.

To achieve the desired controlled positioning, blower 502 may be fixedly secured to support structure 508 within the AHU compartment. Adjacent blower 502 is adjustable platform assembly 500 that is positionable by means of sliding along the support structure 508. Opposite blower 502 adjacent platform assembly 500 is a pusher/puller assembly 520 or adjuster that is fixedly secured to support structure 508. Platform assembly 500 preferably comprises a compact hat section member 501, including a platform portion 522 for securing motor 515, opposed standoff members 524 extending from platform portion 522 and opposed flange members 526 extending outwardly from standoff members 524. However, it is understood that platform assembly 500 may also be configured to adjustably secure blower 502 instead of motor 515, if desired. Each of the flange members 526 of hat section member 501 preferably have a pair of elongated slots 528 formed therein. By loosening fasteners corresponding to each slot 528 that secure the platform assembly 500 to support structure 508, platform assembly 500 is movable along support structure 508. Stated another way, by virtue of slots 528, platform assembly 500 is adjustably securable to support structure 508. It is to be understood that housing 506 of blower 502 and motor 515, without platform assembly 500, are also adjustably securable to support structure 508, but not to the same extent as platform assembly 500, as the apertures formed in motor 515 and blower 502 have less pronounced slotted profiles.

To accommodate different motor mounting arrangements, platform portion 522 of platform assembly 500 includes multiple slots 532 formed therein. Extending from an end of platform portion 522 adjacent the pusher/puller assembly 520 is a flap member 534 configured to secure a pair of threaded blocks 536 preferably positioned along opposite ends of flap member 534. To secure each block 536, at least one bolt 538 is directed through apertures 540 formed in flap member and/or corresponding structure in platform portion 522 to engage threaded block 536. An additional aperture 544 formed in flap member 534 is aligned with a threaded guide aperture 546 formed in each block 536 to permit access to the guide aperture 546, each guide aperture 546 to threadedly receive an elongate threaded member 548 from pusher/puller assembly 520. In addition to providing a means to secure threaded blocks 536, flap member 534 provides enhanced structural stiffness to hat section member 501, the structural stiffness being further buttressed by securing the threaded blocks 536 along the juncture of the standoff member 524 and the flap member 534 of the flap member 534 facing the pusher/puller assembly 520. To provide yet further structural stiffness to hat section member 501, a stiffener 560 is preferably provided approximately midspan of platform portion 522 transverse to standoff members 524. Stiffener 560 is secured to each of platform portion 522 and opposed standoff members 524 by respective fasteners 562-564.

Pusher/puller assembly 520 preferably comprises an angle member 550 having a first leg 552 and a second leg 554, first leg 552 being secured to support structure 508. Vertically extending second leg 554 of the angle member 550 includes two apertures 556 through which each pass adjustment means, such as elongate threaded member 548. It is realized that to use the "pusher" capability of the pusher/puller assembly 520, a retaining means is required, such as a retaining ring 568 (see FIG. 21B), to react the compressive forces directed along the threaded members 548. In an embodiment of pusher/puller assembly 520, the retaining means may be secured to threaded member 548 adjacent second leg 554 opposite the head of threaded member 548 such that second leg 554 is interposed between the retaining means and the head of the threaded member 548 to achieve this "pusher" capability.

In operation, actuation of either or both of elongate threaded members 548 which are each threadedly engaged with block 536, urge platform assembly 500 into controlled movement along support structure 508. This controlled movement is especially critical in effecting proper belt tension while maintaining alignment between sheaves 510, 512 of motor 515 and blower 502. Once elongate threaded members 548 have been sufficiently actuated to provide the desired positioning of platform assembly 500, the fasteners 558 that pass through elongated slots 528 in flange members 526 of platform assembly 500 are secured to support structure 508. Once these fasteners are secured in slots 528, the position of motor 515, and thus, of sheave 512, are fixed with regard to sheave 510 of blower 502. If the heads of fasteners 558 that are positioned in slots 528 to permit sliding movement of the platform assembly 500 and threaded slots 548 are similarly sized, a single tool, such as a wrench, or a ratchet with the properly sized socket may be used to effect alignment and/or tension control of belt 516. It is appreciated that if properly done, such alignment/tension control may only require one hand, which would enable satisfactory access within the tight quarters of an AHU compartment. By periodically monitoring the alignment of sheaves 510, 512 as well as the tension in belt 516 using a conventional belt tension gauge, which monitoring being performed as part of routine maintenance, such as fan bearing lubrication, problems associated with sheave alignment and belt tension should be significantly reduced, if not virtually removed.

Due to the vibration generated by operation of motor 515 and blower 502, fasteners 558 and threaded member 548 may inadvertently loosen and actuate, which could alter the adjusted belt tension. To substantially prevent inadvertent actuation of threaded member 548 and fasteners 558 once the belt tension has been set, locking fasteners are preferably used, and locking means (not shown) including jam nuts, lockwire, a desired grade of thread locking solvent applied to the fastener threads or other methods or devices known in the art may also be used.

Although pusher/puller assembly 520 can be adjustably secured to either motor 515 (e.g., FIG. 21) or blower 502 (e.g., FIG. 21A), preferably pusher/puller assembly 520 is not interposed between motor 515 and blower 502 for reasons of improved access to the heads of threaded members 548. Stated another way, when pusher/puller assembly 520 is positioned adjacent to motor 515 and adjustably secured to motor 515, the distance from pusher/puller assembly 520 to axis 511 of blower 502 is preferably greater than the distance between axis 511 of the blower 502 and axis 513 of motor 515. Similarly, when pusher/puller assembly 520 is positioned adjacent to blower 502 and adjustably secured to blower 502, the distance from pusher/puller assembly 520 to axis 513 of motor 515 is preferably greater than the distance between axis 511 of the blower 502 and axis 513 of motor 515.

Figure 23:
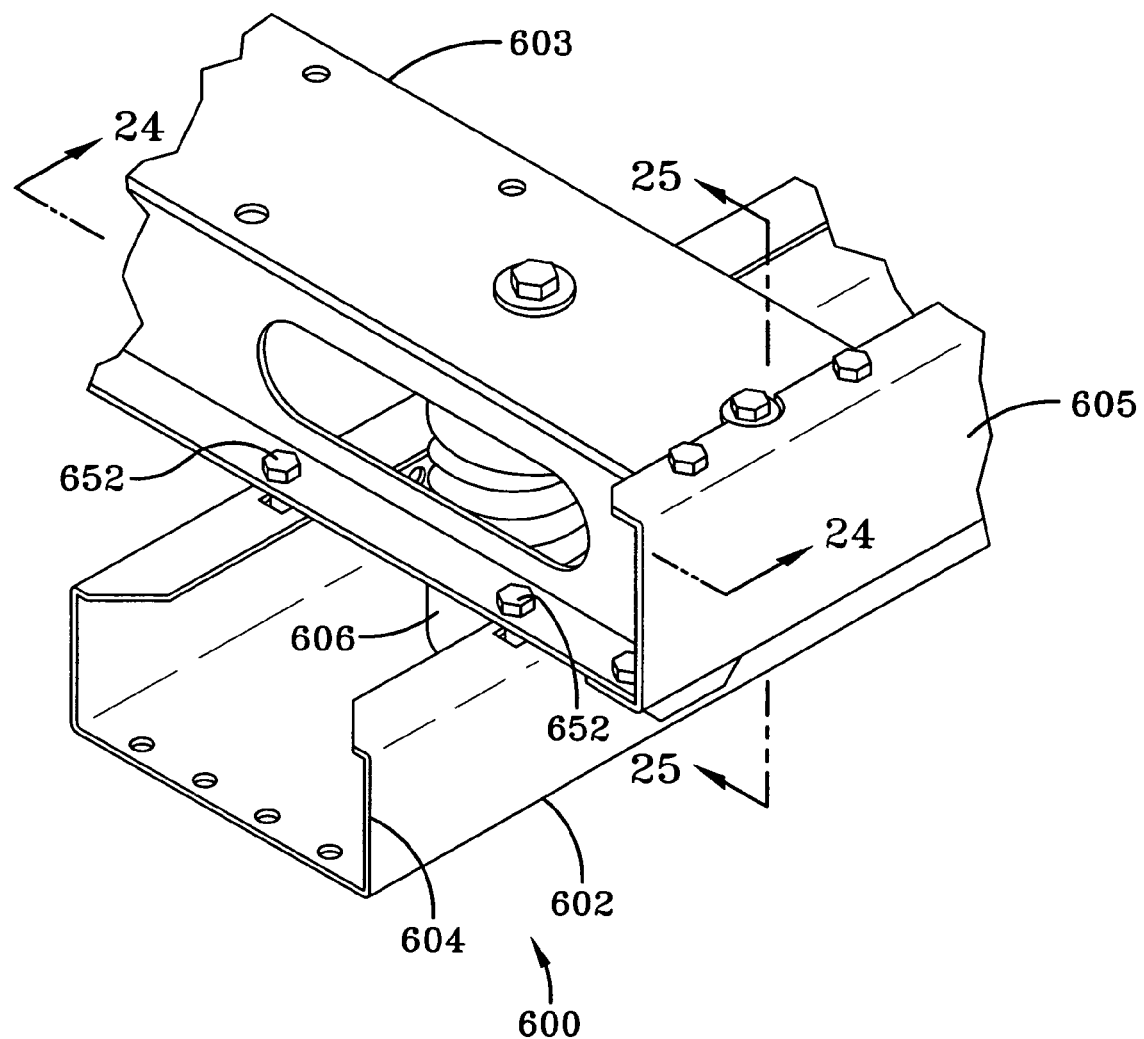
FIG. 23 is a partial perspective view of an AHU rail structure housing a vibration isolator of the present invention.
Figure 24:
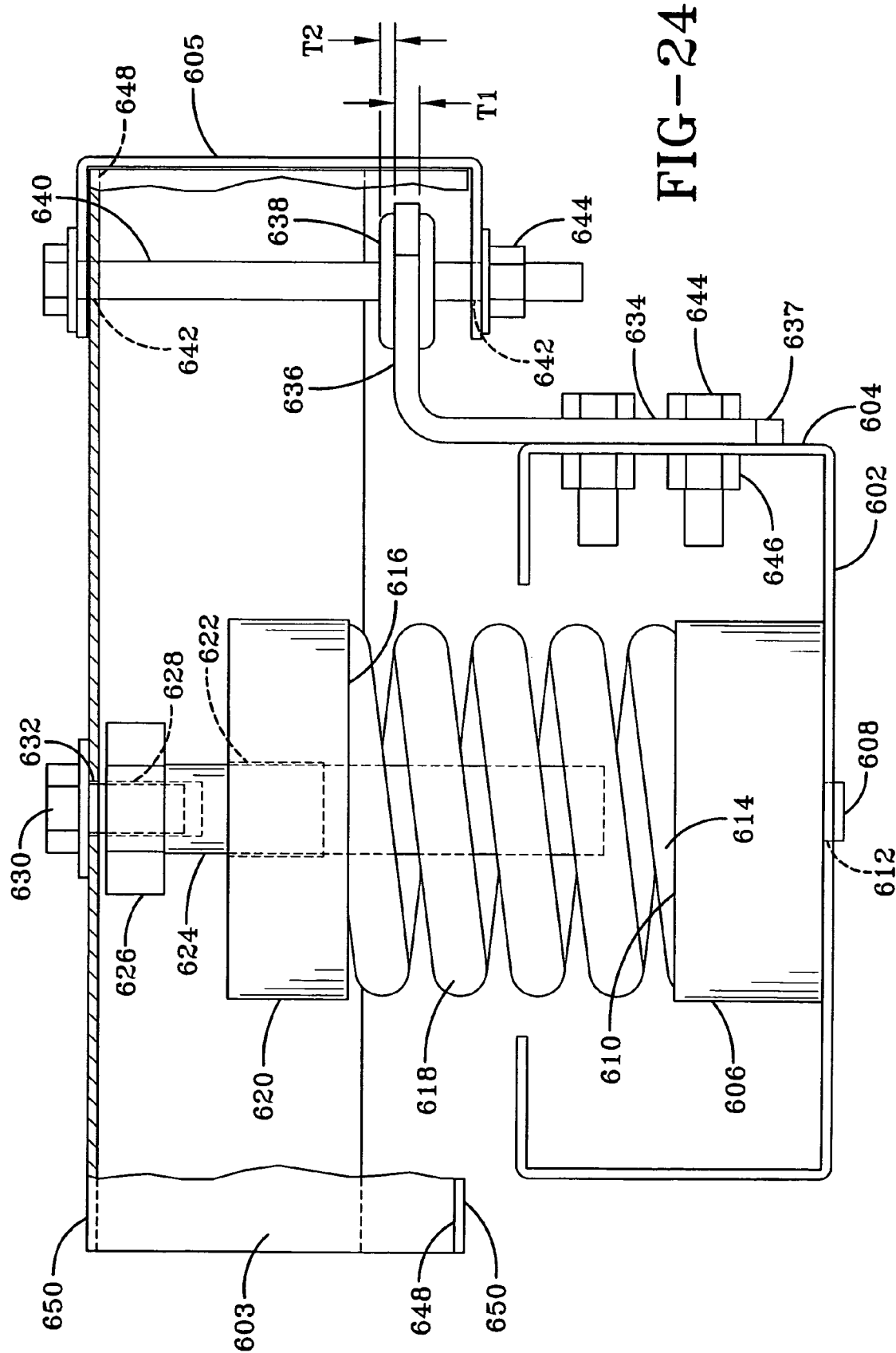
FIG. 24 is an elevation view of the vibration isolator taken along line 24-24 of FIG. 23 of the present invention.
Figure 25:
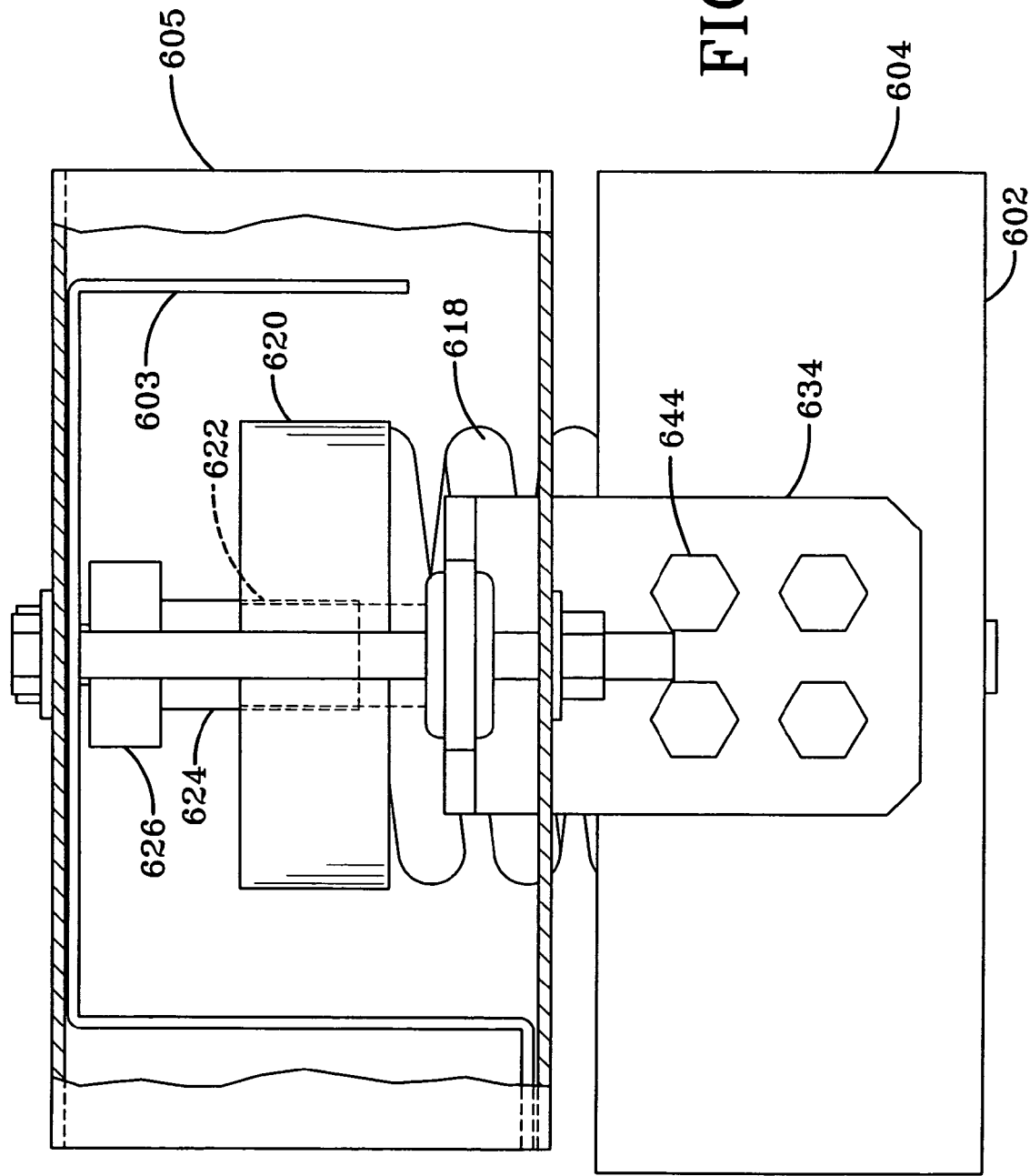
FIG. 25 is an elevation view of the vibration isolator taken along line 25-25 of FIG. 23 of the present invention.

Referring to FIGS. 23-25, is a vibration isolator 600 for providing vibrationally isolated support between a vibrating means of an AHU, such as a fan assembly, that is supported beneath a separate structural frame. At least two isolator rails 602 or frame members having at least one vertical side 604 are mounted to a top panel (not shown) which is supported by, i.e., stacked upon, a pre-existing structural frame. Alternately, isolator rails 602 may also be mounted in the floor, or to any structure requiring vibration isolation and support. Isolator rail 602 connects to a cupped spring retainer 606, preferably of unitary construction and preferably comprising a resilient material, possibly made of hard rubber, for securing a lower end 614 of a spring 618 therein. It is to be understood that the spring 618 can be constructed of a suitable resilient material or an air cylinder. Spring retainer 606 preferably has a centrally positioned protrusion 608 opposite its cupped end 610 for engaging an aperture 612 in the isolator rail 602. An upper end 616 of spring 618 opposite its lower end 614 is preferably received by a cupped threaded spring retainer 620. Threaded spring retainer 620 has a centrally positioned threaded aperture 622 for threadedly receiving an adjusting member 624, such as a bolt or other elongate fastener, and is preferably of unitary construction therein. Since spring retainer 620 may be fabricated from standard bar stock and requires only forming a capped portion and tapping a thread to receive adjusting member 624, and possibly forming flats to receive a wrench to control rotation of the spring retainer 620 in operation, such few standard machining operations are not considered sufficient to classify spring retainer 620 a specially machined component. A head 626 of adjusting member 624 has a coaxially aligned threaded aperture 628 for receiving a cap screw 630 or locking fastener therein. Head 626 preferably defines a number of parallel flats, such as a hexagon, to receive a wrench to control rotation of the adjusting member 624 in operation.

The cap screw 630 operates to prevent the adjusting member 624 from rotating. Upon head 626 of adjusting member 624 abutting a spring rail 603 or frame member that supports the AHU or assembly that is to be vibrationally isolated, cap screw 630 is directed through an aperture 632 in spring rail 603 and into threaded engagement with a threaded aperture 628 formed in head 626 of adjusting member 624. The cap screw 630 is then actuated in a direction so that the head of cap screw 630 abuts spring rail 603. The cap screw 630 is further actuated until the head of cap screw 630 sufficiently compresses the material of spring rail 603 adjacent aperture 632 between the head 626 of adjusting member 624 and the head of cap screw 630 to lock the adjusting member 624 in position.

The assembly to be vibrationally isolated is preferably supported by at least two cross braced spring rails 603. At least three, and preferably at least four, vibration isolators 600 are utilized and positioned to provide a sufficiently broad support platform for the vibrationally isolated assembly. At each position for installing vibration isolator 600, a corresponding portion of spring rail 603 and isolator rail 602 are vertically aligned. Cap screw 630 is directed through an aperture 632 in spring rail 603 and placed in threaded engagement with threaded aperture 628 in head 626 of adjusting member 624 to secure spring 618 to spring rail 603. Centrally positioned protrusion 608 of spring retainer 606 engages aperture 612 in isolator rail 602, the engagement being primarily maintained by the weight of the assembly to be vibrationally isolated. Preferably protrusion 608 is substantially aligned with adjusting member 624.

For vibration isolator 600 to function as intended, spring 618 of each spring isolator 600 must be adjusted to substantially evenly carry the collective weight of the assembly to be vibrationally isolated and supporting spring rails. The spring adjustment is achieved by actuating adjusting member 624 with respect to threaded spring retainer 620 such that head 626 of adjusting member 624 moves vertically in a direction away from threaded spring retainer 620. As head 626 of adjustment bolt 624 moves vertically, it abuts spring rail 603. Further actuation of adjusting member 624 with respect to threaded spring retainer 620, in effect, compresses spring 618, the spring 618 compressive force bearing the weight of the assembly to be vibrationally isolated. Although the weight of the vibrationally isolated assembly is supported once the spring isolators 600 have been sufficiently adjusted, vibrationally isolated lateral support must also be provided for stability and to prevent the centrally positioned protrusion 608 of spring retainer 606 from possibly "bouncing out" of engagement with aperture 612 in isolator rail 602.

To provide this lateral support, a leg of an angle 634 or other structural member is secured by a number of corresponding fasteners, such as nuts 646 and bolts 644, to vertical side wall 604 of isolator rail 602, the horizontally extended leg 636 of angle 634 further securing a grommet 638 therein. A guide member 640, such as a bolt, is then preferably passed through two axially aligned apertures 642 formed in a pair of flanges 650 of spring rail 603 and grommet 638 and secured in position by a nut 644. Guide member 640 and adjusting member 624 are substantially parallel and not coaxial. In this embodiment, spring rail 603 defines a C-shaped channel. Grommet 638 provides vibration isolation between guide member 640 and angle 634 while guide member 640 simultaneously provides the required lateral support for the vibrationally isolated assembly. Furthermore, since the horizontal extending leg 636 is disposed between the two axially aligned apertures 642 of the spring rail 603, the total vertical travel of the spring rail 603 is limited to the distance between opposed inside surfaces 648 of flanges 650 of the spring rail 603 minus the sum of the thickness of the horizontally extending leg 636 ("T1") and the compressed thicknesses of the grommet 638 ("T2") extending from the opposed surfaces of the horizontal extending leg 636. By selectively controlling the length of a vertical leg 637 of angle 634 for a given configuration of rails 602, 603, horizontally extending leg 636 can be selectively vertically positioned between flanges 650 to prevent the centrally positioned protrusion 608 of spring retainer 606 from possibly "bouncing out" of engagement with aperture 612 in isolator rail 602. In addition, since guide member 640 is structurally carried at two positions by spring rail 603 and the horizontally extending leg 638 which provides lateral loading to the spring rail 603 is disposed between these two positions, guide member 640 is not subjected to a cantilevered lateral load. This arrangement permits the guide member 640 and spring rail 603 to be reduced in size, i.e., diameter and gauge thickness, respectively, saving material costs and reducing weight, while providing the required structural strength.

During transport of the assembly to be vibrationally isolated, it is preferable that temporary fasteners 652 (FIG. 23) are used to secure the rails 602, 603 to each other until the assembly is assembled at its final destination.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A belt tensioning system for an air handling unit comprising:
   a blower having a housing adjustably securable to a structure inside the air handling unit, the housing rotatably carrying a first shaft about a first axis, at least one of the housing and the motor comprises a platform interposed between the at least one of the housing and the motor and the structure, the platform being adjustably securable to the structure, the platform having a pair of threaded apertures, each of the pair of threaded members is received by one of the pair of threaded apertures, the platform comprises opposed standoff members, the standoff members extending to opposed flange members, the flange members configured to be adjustably securable to the structure, wherein the platform comprises a pair of blocks secured adjacent opposite ends of the flap member facing the adjuster;
   a first sheave and a bladed arrangement secured to the first shaft;
   a second sheave secured to a second shaft rotatably carried by a motor about a second axis, the motor adjustably securable to the structure;
   a belt engaging the periphery of the first sheave and the second sheave;
   wherein the belt urging the first sheave and the bladed arrangement to rotate about the first shaft in response to the motor urging the second sheave to rotate about the second shaft;
   an adjuster secured to the structure adjacent to at least the blower and the motor, and the adjuster having adjustment means secured to one of the motor when the adjuster is adjacent the motor, the adjustment means secured to the housing when the adjuster is adjacent the blower; and
   wherein actuating the adjustment means to urge at least a portion of one of the housing and the motor in a direction to vary the distance between the first sheave and the second sheave to adjust the tension in the belt.

2. The belt tensioning system of claim 1 wherein the adjustment means is a pair of threaded members.

3. The belt tensioning system of claim 1 wherein the platform defines a hat section profile.

4. The belt tensioning system of claim 3 wherein the platform comprises a pair of blocks secured to the platform, each block having one threaded aperture of the pair of threaded apertures.

5. The belt tensioning system of claim 4 wherein the pair of blocks is secured adjacent to opposite ends of a side of the platform facing the adjuster.

6. The belt tensioning system of claim 1 wherein each of the flange members comprising at least one slot.

7. A belt tensioning system for an air handling unit comprising:
   a blower having a housing adjustably securable to a structure inside the air handling unit, the housing rotatably carrying a first shaft about a first axis, at least one of the housing and the motor comprises a platform interposed between the at least one of the housing and the motor and the structure, the platform being adjustably securable to the structure, the platform having a pair of threaded apertures, each of the pair of threaded members is received by one of the pair of threaded apertures, the platform comprises opposed standoff members, the standoff members extending to opposed flange members, the flange members configured to be adjustably securable to the structure, the platform comprising a pair of blocks secured adjacent opposite ends of the flap member facing the adjuster, wherein each block of the pair of blocks is secured adjacent to one end of one of the standoff members;
   a first sheave and a bladed arrangement secured to the first shaft;
   a second sheave secured to a second shaft rotatably carried by a motor about a second axis, the motor adjustably securable to the structure;
   a belt engaging the periphery of the first sheave and the second sheave;
   wherein the belt urging the first sheave and the bladed arrangement to rotate about the first shaft in response to the motor urging the second sheave to rotate about the second shaft;
   an adjuster secured to the structure adjacent to at least the blower and the motor, and the adjuster having adjustment means secured to one of the motor when the adjuster is adjacent the motor, the adjustment means secured to the housing when the adjuster is adjacent the blower; and
   wherein actuating the adjustment means to urge at least a portion of one of the housing and the motor in a direction to vary the distance between the first sheave and the second sheave to adjust the tension in the belt.

8. The belt tensioning system of claim 1 wherein the adjuster comprises containing means to decrease the belt tension.

9. The belt tensioning system of claim 8 wherein the containing means is a retaining ring.

* * * * *